United States Patent [19]
Schabes et al.

[11] Patent Number: 5,610,812
[45] Date of Patent: Mar. 11, 1997

[54] CONTEXTUAL TAGGER UTILIZING DETERMINISTIC FINITE STATE TRANSDUCER

[75] Inventors: Yves Schabes; Emmanuel Roche, both of Boston, Mass.

[73] Assignee: Mitsubishi Electric Information Technology Center America, Inc., Cambridge, Mass.

[21] Appl. No.: 264,981

[22] Filed: Jun. 24, 1994

[51] Int. Cl.$^6$ ............................................. G06F 7/27
[52] U.S. Cl. ................................... 395/759; 395/794
[58] Field of Search .................. 364/419.01, 419.08, 364/419.02, 419.1, 419.11, 419.16; 395/12, 600

[56] References Cited

U.S. PATENT DOCUMENTS

| | | | |
|---|---|---|---|
| 4,579,533 | 4/1986 | Anderson et al. | 434/157 |
| 4,661,942 | 4/1987 | Okamoto et al. | 364/419.08 |
| 4,674,065 | 6/1987 | Lange et al. | 382/311 |
| 4,830,521 | 5/1989 | Sakai et al. | 400/63 |
| 4,864,501 | 9/1989 | Kucera et al. | 364/419.08 |
| 4,864,502 | 9/1989 | Kucera et al. | 364/419.08 |
| 4,868,750 | 9/1989 | Kucera et al. | 364/419.08 |
| 5,146,405 | 9/1992 | Church | 364/419.08 |
| 5,297,040 | 3/1994 | Hu | 364/419.08 |
| 5,333,313 | 7/1994 | Heising | 395/600 |

OTHER PUBLICATIONS

Karttunen; "Finite–State Constraints"; *International Conference on Current Issues in Computational Linguistics*; Jun. 10–14, 1991.

Kupiec; "Robust Part–of–Speech Tagging Using a Hidden Markov Model"; *Computer Speech and Language* (1992) 6; 225–242.

Dialog Abstract; File 2, Acc#04284972; Moisl; "Connectionist Finite State Natural language Processing"; *Connection Science*; v4 n2; pp. 67–91.

*Primary Examiner*—Donald E. McElheny, Jr.
*Assistant Examiner*—Stephen R. Tkacs
*Attorney, Agent, or Firm*—Robert K. Tendler, Esq.

[57] ABSTRACT

A system for assigning part-of-speech tags to English text includes an improved contextual tagger which utilizes a deterministic finite state transducer to improve tagging speed such that large documents can have its sentences accurately tagged as to parts of speech to permit fast grammar checking, spell checking, information retrieval, text indexing and optical character recognition. The subject system performs by first acquiring a set of rules by examining a training corpus of tagged text. Then, these rules are transformed into a deterministic finite-state transducer through the utilization of non-deterministic transducers, a composer and a determiniser. In order to tag an input sentence, the sentence is initially tagged by first assigning each word in the sentence with its most likely part of speech tag regardless of the surrounding words in the sentences. The deterministic finite-state transducer is then applied on the resulting sequence of part of speech tags using the surrounding words and obtains the final part of speech tags. The Subject System requires an amount of time to compute the part-of-speech tags which is proportional to the number of words in the input sentence and which is independent of the number of rules it has applied.

9 Claims, 7 Drawing Sheets

CONTEXTUAL TAGGER UTILIZING DETERMINISTIC FINITE STATE TRANSDUCER

FIELD OF INVENTION

This invention relates to a system that computes the parts of speech tags of English text and more particularly to a part-of-speech tagger utilizing a deterministic finite state transducer whose rules are automatically learned from a training corpus.

BACKGROUND OF THE INVENTION

English words are ambiguous with respect to their parts-of-speech. For instance a given word can function as a noun, a verb in past tense, and a verb in past participle. For example, the word "left" can be an adjective, as in "I took a left turn"; a noun, as in "He is on my left"; as the past tense of the verb "leave", as in "He left yesterday"; and as the past participle of the verb leave (as in "He has left"). However in context English words are not ambiguous. Most applications dealing with English text need to assign the correct part-of-speech to each word in the context it appears. This problem is called part-of-speech tagging.

The ability to detect the sequence of parts-of-speech as they exist in a given sentence is of paramount importance for many applications involving English text such as grammar checkers, spell checkers, text retrieval, speech recognition, hand writing recognition devices, character recognition devices and text compression devices. The result of having derived parts-of-speech is a part-of-speech sequence such as "PRONOUN, VERB, DETERMINER, NOUN, VERB" for an input sentence "I heard this band play".

Previous methods for assigning part-of-speech tags to English text consist of either statistically based methods or rule-based methods. Examples of statistically-based methods are the method of Kenneth Church's Stochastic Parts Program published as "A Stochastic Parts Program and Noun Phrase Parser for Unrestricted Text" in the Proceedings of the Second Conference on Applied Natural Language Processing, Austin Tex., 1988, or the one of Charniak, Eugene, Curtis Hendrickson, Neil Jacobson, and Mike Perkowitz published as "Equations for part-of-speech tagging" in the Proceedings of the AAAI 93, Ninth National Conference on Artificial Intelligence 1993, or the method of Julian Kupiec published as "Robust part-of-speech tagging using a hidden markov model" in the journal of Computer Speech and Language volume 6 in 1992 or the one of Ralph Weischedel, Marie Meteer, Richard Schwartz, Lance Ramshaw, and Jeff Palmucci published as "Coping with ambiguity and unknown words through probabilistic models" in the journal of Computation Linguistics volume 18, number 2 in 1993. An example of a rule-based method is the method of Eric Brill published as "A simple rule-based part of speech tagger" in the proceedings of the Third Conference on Applied Natural Language Processing in 1992.

Prior art methods for assigning part of speech tags are very slow since the time required to assign part of speech tags is related to the number of words in the input sentence and also to the number of rules they use. This makes the prior art systems inapplicable to very large English texts such as the contents of a library.

Recently, as indicated above, Brill described a rule-based tagger which performs as well as taggers based upon probabilistic models and which overcomes the limitations common in rule-based approaches to language processing. It is robust and the rules are automatically acquired. In addition, the tagger requires drastically less space than stochastic taggers. However, current implementations of Brill's tagger are considerably slower than the ones based on probabilistic models since it may require RCn elementary steps to tag an input of n words with R rules requiring at most C words of context.

In Brill, as an example, 200 contextual tagging rules are used, one-by-one for each word to obtain the part of speech tag. This is relatively slow because each of the rules is applied individually on each word and because the output of one rule may be changed by the output of a later rule. One reason for the relatively slowness of the Brill system is his non-deterministic approach in which the output of one rule may be changed by the output of another rule. On the other hand, a deterministic system is desireable to increase speed in which after each word is read only one part of speech choice is made; and this without requiring more than one pass on the input sentence.

Note that Brill's tagger is comprised of three parts, each of which is inferred from a training corpus: a lexical tagger, an unknown word tagger and a contextual tagger. For the purpose of exposition, the discussion of the unknown word tagger is postponed and the focus of the following discussion is mainly the contextual rule tagger.

The notation for part-of-speech tags is as follows: "pps" stands for third singular nominative pronoun, "vbd" for verb in past tense, "np" for proper noun, "vbn" for verb in past participle form, "by" for the word "by", "at" for determiner, "nn" for singular noun and "bedz" tbr the word "was".

By way of background, the lexical tagger used by Brill initially tags by assigning each word its most likely tag, estimated by examining a large tagged corpus, without regard to context. For example, assuming that "vbn" is the most likely tag for the word "killed" and "vbd" for "shot", the lexical tagger might assign the following part-of-speech tags:

(1) Chapman/np killed/vbn John/np Lenon/np (2) John/np Lenon/np was/bedz shot/vbd by/by Chapman/np (3) He/pps witnessed/vbd Lenon/np killed/vbn by/by Chapman/np Since the lexical tagger used by Brill does not use any contextual information, many words can be wrongly tagged. For example, in (1) the word "killed" is erroneously tagged as a verb in past participle form, and in (2) "shot" is incorrectly tagged as a verb in past tense. Given the initial tagging obtained by the lexical tagger, in the Subject System a contextual tagger applies a sequence of rules in order and attempts to remedy the errors made by the initial tagging. For example, the rules below might be found in a contextual tagger.

rule 1: vbn vbd PREVTAG np rule 2: vbd vbn NEXTTAG by

The first rule says to change tag "vbn" to "vbd" if the previous tag is "np". The second rule says to change "vbd" to tag "vbn" ff the next tag is "by". Once the first rule is applied, the tag for "killed" in (1) and (3) is changed from "vbn" to "vbd" and the following tagged sentences are obtained:

(4) Chapman/np killed/vbd John/np Lenon/np (5) John/np Lenon/np was/bedz shot/vbd by/by Chapman/np (6) He/pps witnessed/vbd Lenon/np killed/vbd by/by Chapman/np And once the second rule is applied, the tag for "shot" in (5) is changed from "vbd" to "vbn" resulting (8) and the tag for "killed" in (6) is changed back from "vbd" to "vbn" resulting (9):

(7) Chapman/np killed/vbd John/np Lenon/np (8) John/np Lenon/np was/bedz shot/vbn by/by Chapman/np (9) He/pps witnessed/vbd Lenon/np killed/vbn by/by Chapman/np In Brill, the sequence of contextual rules is automatically inferred from a training corpus. A list of tagging errors, with their counts, is compiled by comparing the output of the lexical tagger to the correct part-of-speech assignment. Then, for each error, it is determined which instantiation of a set of rule templates results in the greatest error reduction. Then the set of new errors caused by applying the rule is computed and the process is reiterated until the error reduction drops below a given threshold. The following Table illustrates a set of contextual rule templates.

TABLE I

| A | B | PREVTAG | C | change A to B if previous tag is C |
|---|---|---|---|---|
| A | B | PREV1OR2OR3TAG | C | change A to B if previous one or two or three tag is C |
| A | B | PREV1OR2TAG | C | change A to B if previous one or two tag is C |
| A | B | NEXT1OR2TAG | C | change A to B if next one or two tag is C |
| A | B | NEXTTAG | C | change A to B if next tag is C |
| A | B | SURROUNDTAG | C D | change A to B if surrounding tags are C and D |
| A | B | NEXTBIGRAM | C D | change A to B if next two tags are C and D |
| A | B | PREVBIGRAM | C D | change A to B if previous two tags are C and D |

After training the set of contextual rule templates described in Table I, 280 contextual rules are obtained. The resulting rule-based tagger performs as well as the state of the art taggers based upon probabilistic models and overcomes the limitations common in rule-based approaches to language processing: it is robust and the rules are automatically acquired. In addition, the tagger requires drastically less space than stochastic taggers. However, Brill's tagger is inherently slow.

Once the lexical assignment is performed, Brill's algorithm applies each contextual rule acquired during the training phase, one by one, to each sentence to be tagged. For each individual rule, the algorithm scans the input from left to right while attempting to trigger the rule. This simple algorithm is computationally inefficient for two reasons.

The first reason for inefficiency is the fact that an individual rule is attempted on each token of the input regardless of the fact that some of the current tokens may have been previously examined by attempting to apply the same rule at a previous position. The algorithm works as if each rule is a template of tags that is being slided next to the input. Consider, for example, the rule A B PREVBIGRAM C C that changes tag A to tag B if the previous two tags are C. When applied to the input C D C C A, three alignments are attempted and at each step no record of previous partial matches or mismatches are recorded, as can be seen from the following tables.

TABLE II

The first alignment aligns CCA with CDC:

| C | D | C | C | A |
|---|---|---|---|---|

| C | C | A |
|---|---|---|

TABLE III

The second alignment aligns CCA with DCC:

| C | D | C | C | A |
|---|---|---|---|---|

| C | C | A |
|---|---|---|

TABLE IV

The third alignment aligns CCA with CCA:

| C | D | C | C | A |
|---|---|---|---|---|

| C | C | A |
|---|---|---|

In this example, the second alignment could have been skipped by using the information from the first alignment.

The second reason for inefficiency is the potential interaction between rules. For example, when the rule 1 and rule 2 are applied to sentence "He/pps witnessed/vbd Lenon/np killed/vbn by/by Chapman/np" the first rule results in the change:

"He/pps witnessed/vbd Lenon/np killed/vbd by/by Chapman/np"which is undone by the second rule resulting in "He/pps witnessed/vbd Lenon/np killed/vbn by/by Chapman/np"

The algorithm may therefore perform unnecessary computation. In summary, Brill's algorithm for implementing the contextual tagger may require RCn elementary steps to tag an input of n words with R contextual rules requiring at most C tokens of context.

SUMMARY OF THE INVENTION

In contradistinction to Brill, the tagger to be described requires n steps to tag a sentence of length n, independently of the number of rules and the length of the context they require.

Note that each rule in Brill's tagger can be viewed as a non-deterministic finite state transducer, with the application of all rules in Brill's tagger being obtained by combining each of these non-deterministic transducers into one non-deterministic transducer.

On the other hand, the Subject Tagger rejects the use of this non-deterministic transducer approach in favor of a deterministic transducer in which a sentence is tagged both in accordance with context and in a single pass. In order to accomplish this, the deterministic transducer memorizes the relevant context and converts it into a finite set of states. The term "finite state" refers to the capability of the transducer to remember only a finite number of contexts of the input sentence, when the input sentence is read from left to right. Thus a finite state transducer transforms an input sentence to a tagged output sentence while utilizing at each point only a finite number of words of the part of the input sentence it has already read.

Adding the deterministic quality further limits the transduction so that for each input word only one tagging choice is made. The subject deterministic finite state transducer operates by postponing any choice until enough context is read, meaning that the choice is made only after it has been ascertained that one choice among the possible choices is correct.

The resulting deterministic transducer is a part-of-speech tagger which operates in optimal time in the sense that the time to assign tags to a sentence corresponds to the time required to deterministically tag following a single path in this finite state machine. The lexicon used by the Subject System is also optimally encoded using a finite state machine.

In one emodiment, in order to construct a system that assigns part of speech tags to English text, the Subject System first acquires a set of tagging rules by examining a training corpus of tagged text. During this training phase, each word in the dictionary is associated to its most likely part of speech in the training corpus. For example, the part of speech "VERB-PAST-TENSE" is associated with the word "left". This same word could also be "ADJECTIVE" but this part of speech tag is less likely for the word "left" and it is not recorded. Tagging text according to this dictionary leads to numerous errors such as for a sentence like "Turn left at the light". This initial tagging is corrected by applying a sequence of contextual rules acquired automatically from the training corpus. An example of such rule is "CHANGE VERB-PAST-TENSE TO ADJECTIVE IF THE PREVIOUS TAG IS VERB". These rules are automatically acquired by compiling a list of tagging errors with their counts obtained by comparing the first output to the correct part-of-speech assignment.

Then, for each error, it is determined which instantiation of a set of rule templates results in the greatest error reduction. Thereafter the set of new errors caused by applying the rule is computed and the process is reiterated until the error reduction drops below a specified number or threshold. After training a set of contextual rule templates on a corpus of thirty thousand sentences associated with their correct parts-of-speech, two hundred and eighty contextual rules are obtained. These rules are then transformed into a compact device called a deterministic finite-state transducer which functions as the contextual tagger. A finite-state transducer is a finite-state automaton whose transitions are labeled by pairs of symbols. The first symbol is the input and the second is the output. Applying a finite-state transducer to an input consists in following a path according to the input symbols while storing the output symbols, the result being the sequence of output symbols stored.

Given a set of rules, the Subject Tagger is constructed in four steps. The first step consists in turning each contextual rule found into a finite-state transducer called a Rule to Transduce transformer. Each of the contextual rules is defined locally, that is the transformation it describes must be applied at each position of the input sequence. For instance, the rule "A B PREV1OR2TAG C", that changes the part-of-speech tag A into B if the previous tag or the one before is C, must be applied twice on C A A, resulting in the output C B B. The second step consists in turning the transducers produced by the preceding step into transducers that operate globally on the input in one pass. This is accomplished by a local extension transformer. The third step uses a composer to combine all transducers into one single transducer. This corresponds to the formal operation of composition defined on transducers. The transducer obtained in the previous step is still not optimal since it may contain some non-determinism. The fourth and final step consists in transforming the finite-state transducer obtained in the previous step into an equivalent deterministic transducer using a determiniser. The resulting finite-state transducer is the contextual part-of-speech tagger that operates on an initially tagged sentence, tagged with a lexical tagger and an unknown word tagger, in linear time independently of the number of rules and of the length of the context. The subject tagger is thus optimized to operate faster than any other existing system.

BRIEF DESCRIPTION OF THE DRAWINGS

These and other features of the Subject Invention will be better understood taken into conjunction with the Detailed Description in conjunction with the Drawings of which.

DETAILED DESCRIPTION a) Construction of the Contextual Tagger

Figure 1:
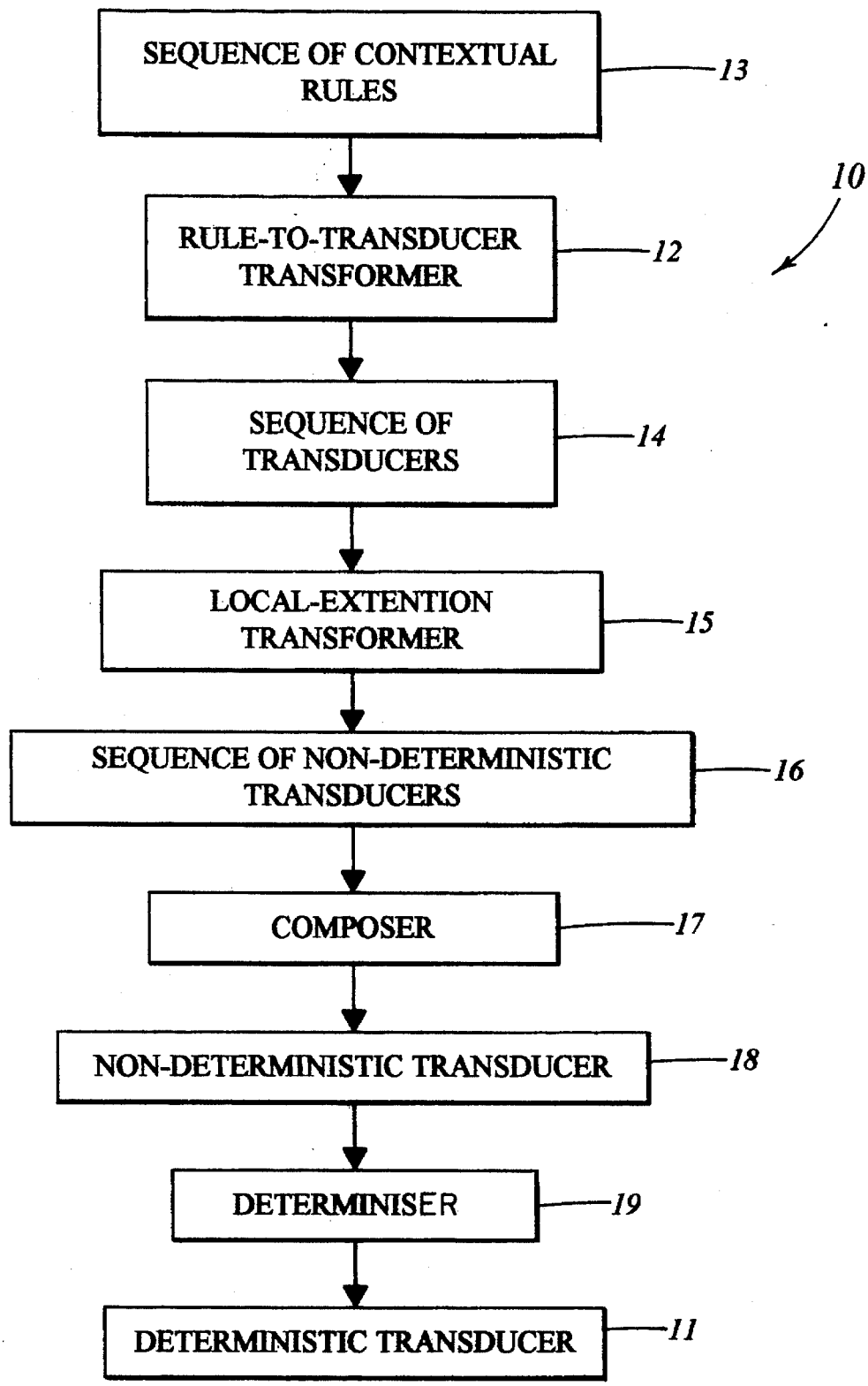
FIG. 1 is a block diagram illustrating the construction of the finite state transducer implementing the contextual rules used by the part of speech tagger which consists in transforming the sequence of contextual rules into a sequence of finite state transducers and then transforming to their local extensions, followed by composing them together to produce a non-deterministic transducer which is then determinised.

As to the construction of the subject Contextual Tagger which is used to improve on an initially tagged sentence referring now to FIG. 1, a method 10 for producing a contextual tagger 11 which is a finite-state transducer, also referred to as a deterministic transducer, utilizes a Rule-to-Transducer transformer 12, the input to which is a sequence of contextual rules 13. The output 14 of Rule-to-Transducer transformer 12 actually constitutes a contextual tagger, but is excessively slow because of non-deterministic choices involved in the transduction and because of the necessity of applying the transducer to each position of the input sentence.

In order to improve the speed of such a contextual tagger, the output of transformer 12 which is a sequence of transducers 14 is coupled to a local extension transducer 15 which permits applying the transducer only once on the input, as opposed to applying it iteratively on each suffix of the input sentence if this is accomplished through the utilization of a specialized algorithm described hereinafter.

The output of transformer 15 is a sequence of non-deterministic transducers 16, in which the term "non-deterministic" refers to multiple choices taken at each position of the input sentence. The result of applying the specialized algorithm is a contextual tagger which is somewhat faster than the contextual tagger corresponding to transducer 12 but which is still relatively slow because there are many transducers to apply to the input sentence, and because each one of them is non-deterministic.

In order to further increase the speed of the contextual tagger, the output of Local Extension Transformer 15 is applied to a composer 17 which merges all the non-deterministic transducers into one omnibus non-deterministic transducer 18. In this case, the result is a contextual tagger in which one omnibus transducer is applied to the sentence.

While omnibus non-deterministic transducer 18 provides a much improved contextual tagger in the sense of the speed with which an input sentence can be tagged, the transducer is nonetheless non-deterministic. Thus when analyzing parts of speech, the tagger must proceed down multiple paths before it can determine whether the path leads to a solution or not. Going down blind paths is time consuming, requiring a system for optimizing the process such that the determination of the part-of-speech of a word is recognized without the necessity of multiple paths of computation.

In order to eliminate the problems associated with non-deterministic transducers, the output of the omnibus non-deterministic transducer 18 is applied to a determiniser 19 which postpones decisions as to which path to compute until enough information about the input sentence is provided in order to make a correct choice. When the determiniser sees two paths, decisions are postponed until a following word indicates which of the paths will lead to a solution. Thus the determiniser looks at a following word or words in the sentence to ascertain which path will lead to a solution, at which point that path is chosen. The output of determiniser 19 thus constitutes a deterministic transducer such as tagger 11. Thus contextual tagger 11, unlike Brill's contextual tagger, utilizes a deterministic finite-state transducer.

Note that the function represented by each contextual rule can be represented as a non-deterministic finite state transduction and the sequential application of each contextual rule also corresponds to a non-deterministic finite state transduction which is the result of the composition of each individual transduction. This representation allows one to turn the non-deterministic transducer to a deterministic transducer. The resulting part-of-speech tagger operates in linear time independently of the number of rules and of the length of the context. The new tagger operates in optimal time in the sense that the time to assign tags to a sentence corresponds to the time required to deterministically follow a single path in the resulting finite state machine.

The Subject System relies on two central notions: the notion of finite-state transducer and the notion of sequential transducer. As defined herein, a finite-state transducer is a finite-state automaton whose transitions are labeled by pairs of symbols. The first symbol is the input and the second is the output. Applying a finite-state transducer to an input consists in following a path according to the input symbols while storing the output symbols, the result being the sequence of output symbols stored.

For the present purpose, when pictorially describing a finite-state transducer: final states are doubly circled; E represents the empty string; on a transition from state i to state j, a/b indicates a transition on input symbol a and output symbol(s) b; the question mark(?) in an arc transition (for example labeled ?/b) originating at state i stands for any input symbol that is not referred as input symbol in any other outgoing arcs from i.

Figure 2:
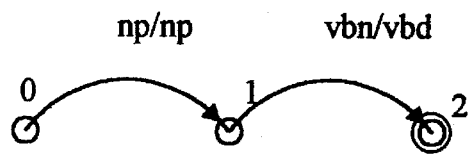
FIG. 2 is a diagram illustrating the finite state transducer for the contextual rule which changes "vbn" to "vbd" if the previous tag is "np"

Specifically, given a sequence of contextual rule 2, the sequence of contextual rules is turned into a sequence of finite-state transducers by a rule-to-transducer transformer. For example, the functionality of the rule "vbn vbd PREVTAG np" is turned into the transducer shown in FIG. 2.

Each of the contextual rules is defined locally, that is the transformation it describes must be applied at each position of the input sequence. For instance, the rule A B PREV1OR2TAG C, that changes A into B if the previous tag or the one before is C, must be applied twice on C A A (resulting the output C B B). We now improve this aspect.

Speed is improved by turning the sequence of transducers previously produced into a sequence of transducers via a local extension transformer that operates globally on the input in one pass. Given a function f1 that transforms, for instance, a into b (i.e. f1 (a)=b), one wants to extend it to a function f2 such that f2(w)=w0 where w0 is the word built from the word w where each occurrence of a has been replaced by b. One says that f2 is the local extension of f1 and one writes f2=LocExt(f1).

Figure 3:
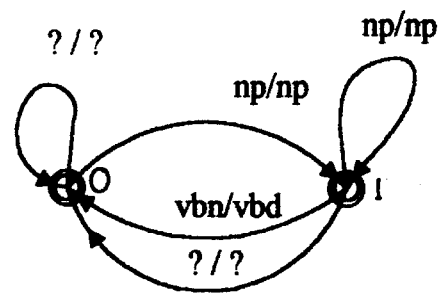
FIG. 3 is a diagram illustrating the local extension of the finite state transducer shown in FIG. 2.
Figure 4:
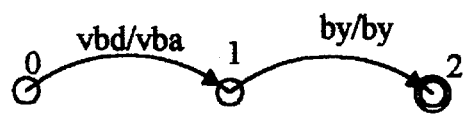
FIG. 4 is a diagram illustrating the finite state transducer for the contextual rule which changes "vbd" to "vbn" if the next tag is "by".
Figure 5:
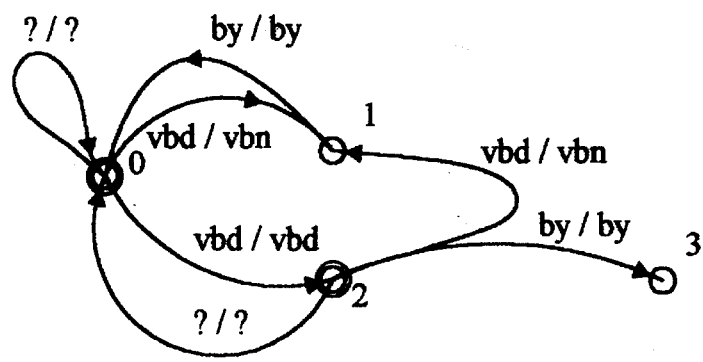
FIG. 5 is a diagram illustrating the local extension of the finite state transducer shown in FIG. 4.

The local extension of the transducer for the rule "vbn vbd PREVTAG np" is shown in FIG. 3. Similarly, the transducer for the contextual rule "vbd vbn NEXTrAG by" and its local extension are shown in FIGS. 4 and 5.

The sequence of transducers obtained above still needs to be applied one after the other. These transducers are combined all transducers into one single transducer by a Composer. This corresponds to the formal operation of composition defined on transducers. For example, the transducer obtained by composing the local extension of T2 of FIG. 3 with the local extension of T1 of FIG. 5 is shown in FIG. 6.

The final transducers is obtained by transforming the finite-state transducer previously described into an equivalent deterministic transducer by a Determiniser.

Figure 6:
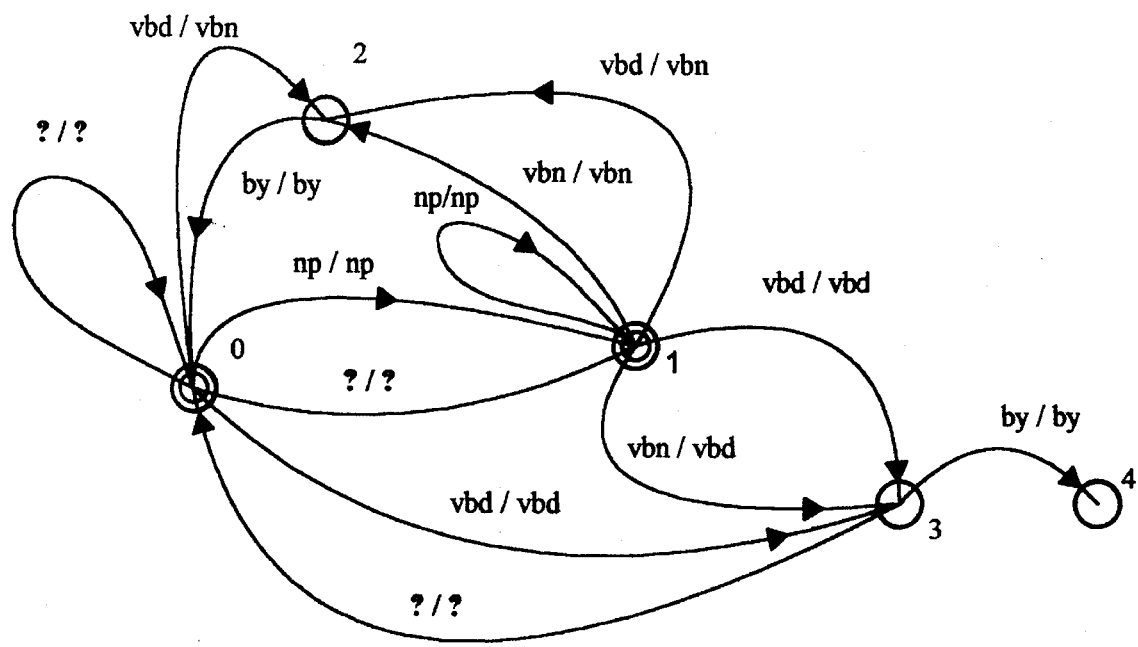
FIG. 6 is a diagram illustrating the composition of the finite state transducers shown in FIG. 3 and FIG. 5.
Figure 7:
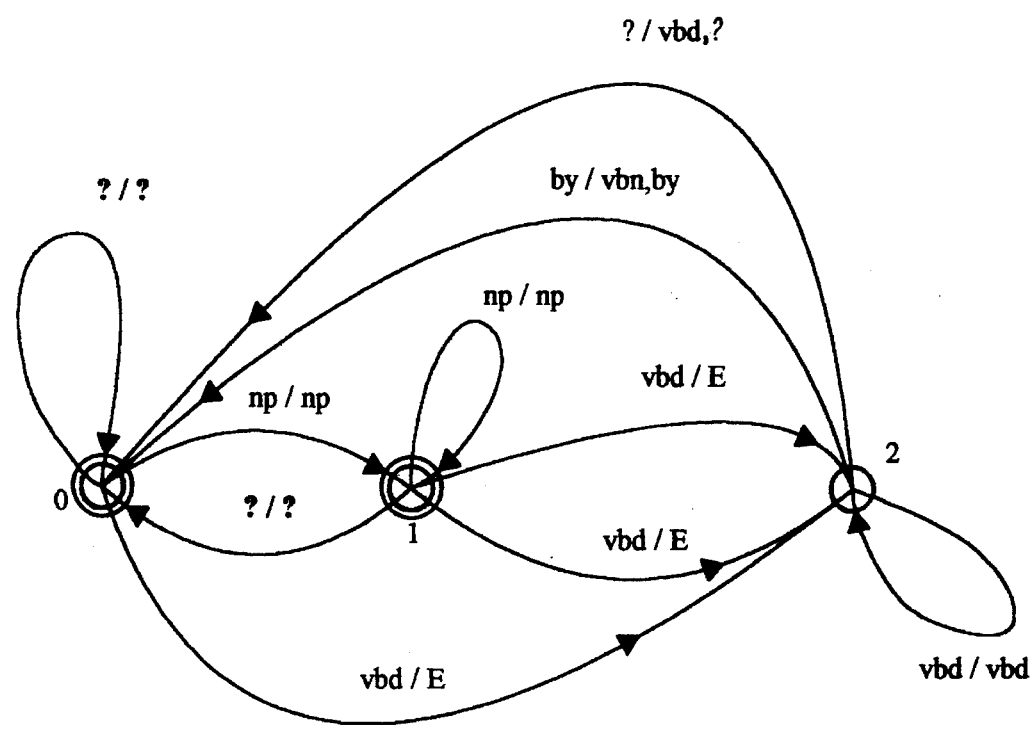
FIG. 7 is a diagram illustrating the determinisation of the finite state transducer shown in FIG. 6.

For example, the transducer illustrated in FIG. 6 is non-deterministic since it has some non-deterministic paths. For instance, from state 0 on input symbol vbd two possible emissions are possible, vbn, from 0 to 2, and vbd, from 0 to 3. This non-determinism is due to the rule "vbd vbd NEXT-TAG by" since this rule requires to read the second symbol before it can know which symbol must be emitted. The deterministic version of the transducer T3 is shown in FIG. 7. Whenever non-determinism arises in T3, in the deterministic machine the empty symbol E is emitted and the emission of the output symbol is postponed. For example, from the start state 0 the empty string is emitted on input vbd, while the current state is set to 2. If the following word is "by", the two token string "vbn by" is emitted, from 2 to 0, otherwise "vbd" is emitted, depending on the input from 2 to 2 or from 2 to 0.

The resulting transducer 11 is a part-of-speech tagger that operates in linear time independently of the number of rules and of the length of the context. The Subject System therefore operates in optimal time.

Figure 8:
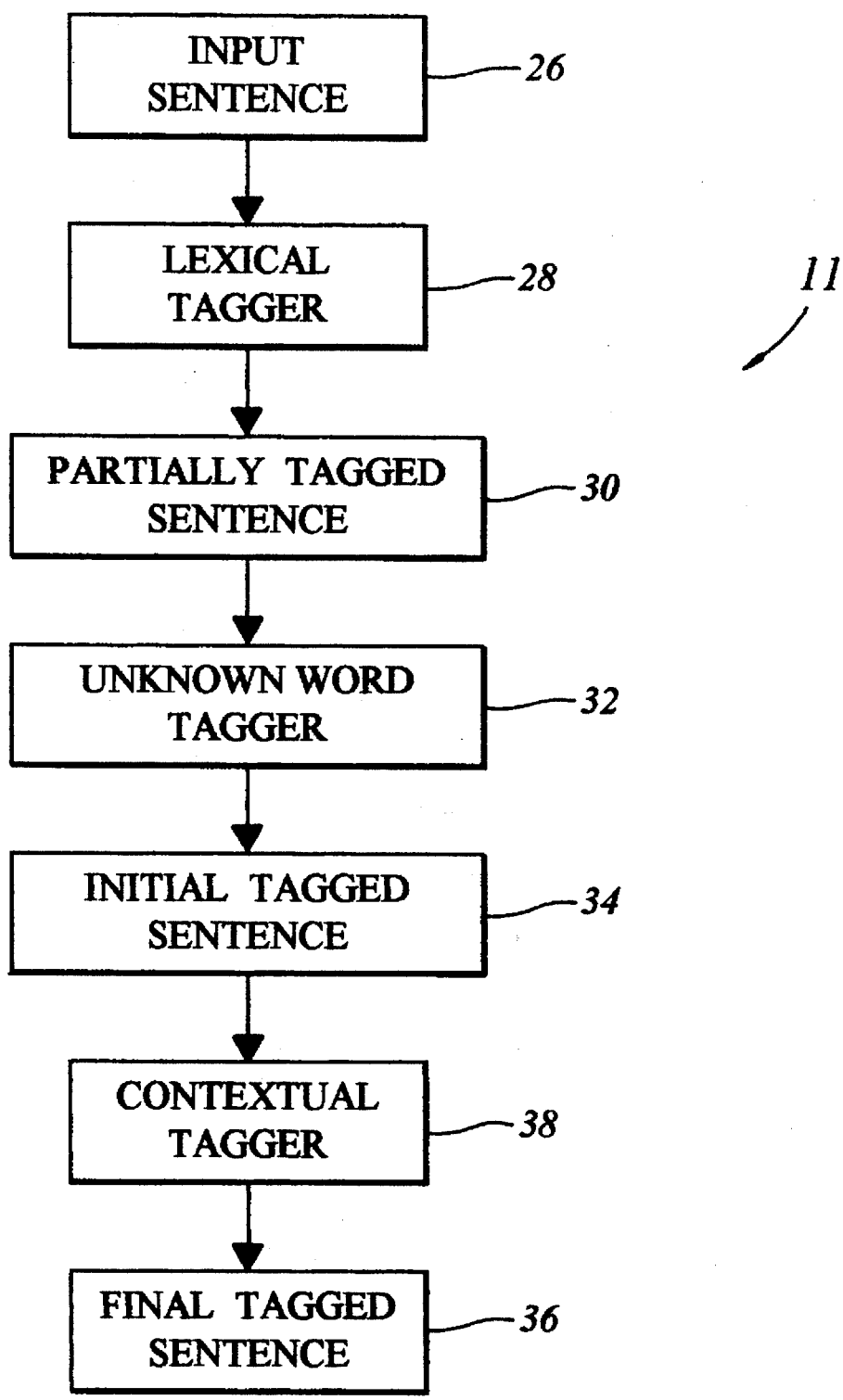
FIG. 8 is a block diagram of a complete part of speech tagger illustrating the use of a lexical tagger which produces a partially tagged sentence which is then processed by an unknown word tagger which produces an initial tagger sentence which is then corrected by a contextual tagger which produces the final part of speech tags for the input sentence.

Referring now to FIG. 8, the contextual tagger 11 The process of tagging requires an input sentence 26 in which a lexical tagger 28 looks up each word in a dictionary and assigns the most likely tag to each word in the sentence to provide a partially tagged sentence 30. The output of lexical tagger 28 is a partially tagged sentence since some words may be not found in the dictionary. The words left untagged in the partially tagged sentence 30 are tagged by an unknown word tagger 32 which guesses tags by looking at the last three letters of the unknown words. The output of the unknown word tagger 32 is the initial tagged sentence 34. The contextual tagger as constructed in FIG. 1 as deterministic transducer 11 is applied to the initial tagged sentence 34 to produce the final tagged sentence 36.

Since the dictionary is the largest part of the tagger in term of space, a compact representation is crucial. Moreover, the lookup process has to be very fast too, otherwise the improvement of the speed of the contextual manipulations would be of little practical interest. To achieve high speed for this procedure, the dictionary is represented by a deterministic finite-state automaton with both fast access and small storage space. The algorithm, as described by Revuz, Dominique in 1991 as "Dictionnaires et Lexiques, Methodes et Algorithmes", Ph.D.thesis, Universite Paris 7, consists in first building a tree whose branches are labeled by letters and whose leaves are labeled by a list of tags (such as nn vb) and then reducing it the minimum directed acyclic graph (DAG).

Figure 9:
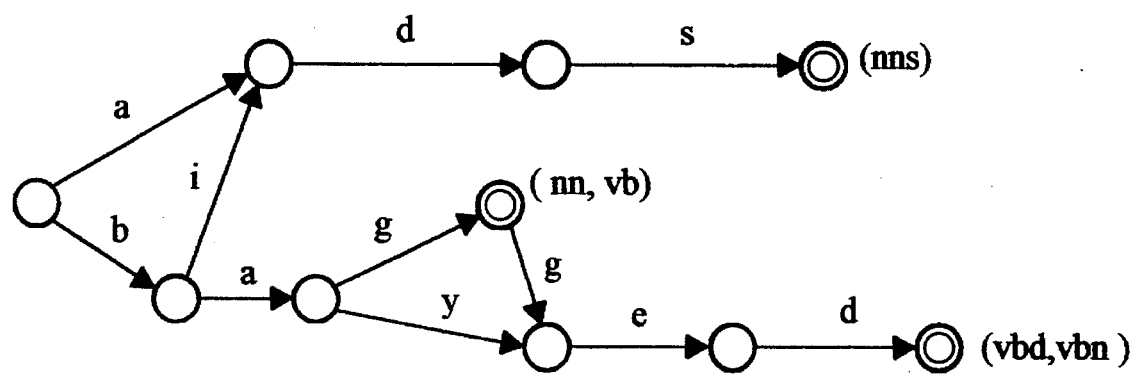
FIG. 9 is a diagram illustrating the encoding of a lexicon by with a finite state automaton.

For example, the DAG of FIG. 9 encodes the following words and part of speech tags: ads nns; the word "bag" which can be a noun "nn" and a verb "vb"; the word "bagged" which can be the past participle "vbn" or the past tense "vbd"; the word "bayed" which can be the past participle "vbn" or the past tense "vbd"; and the "bids" which can be a plural noun "nns".

When a dictionary is represented by a DAG, looking up a word in it consists simply in following one path in the DAG. The complexity of the lookup procedure depends only on the length of the word and is, in particular, independent of the size of the dictionary.

The Subject System operates after all the known words, that is the words listed in the dictionary, have been tagged by a module by their most frequent tag and before the set of contextual rules is applied. This module guesses a tag for a word according to its suffix (e.g. a word of with an "ing" suffix is likely to be a verb), its prefix (e.g. a word starting with an uppercase character is likely to be a proper noun) and other relevant properties. This module basically follows the same techniques as the ones used to implement the lexicon.

The Subject System tagger has an accuracy comparable to the accuracy of statistical-based methods. However it runs at a much higher speed. The Subject System tagger runs nearly ten times faster than the fastest of the other systems. Moreover, the finite-state tagger inherits from the rule-based system its compactness compared to a statistical-based tagger. In fact, whereas statistical-based taggers have to store words, bigrams and trigrams probabilities, the rule-based tagger and therefore the finite-state tagger, only has to store a small number of rules, e.g. between 200 and 300.

The Subject System was empirically compared with Eric Brill's implementation of his tagger, and with a trigram tagger adapted from the work of Church known as "A stochastic parts program and noun phrase parser for unrestricted text" described in 1998 in the Second Conference on Applied Natural Language Processing. The three programs were run on large files Table I summarizes our experiments. All taggers were trained on a portion of the brown corpus. The experiments were run on a HP720 with 32Mbytes of memory. All three taggers have approximately the same precision (95% of the tags are correct). By design, the finite-state tagger produces the same output as the rule- based tagger.

TABLE V

|  | Statistical-Based Tagger | Rule-Based Tagger | Subject System |
| --- | --- | --- | --- |
| Speed | 1200 words/sec | 500 words/sec | 10800 words/sec |
| Space | 2200 KB | 379 KB | 815 KB |

It will be appreciated that the Subject System runs much faster than any previously existing system. This is of paramount importance when tagging large amounts of text such as the text contained in an electronic library.

b) Local-Extension Transformer

What is now more precisely described is the notion and the implementation of Local-Extension. The idea is to transform a function that is defined locally into a function defined globally. In other words, suppose one has the function T1 of FIG. 10, this function transforms the word "ab" into "bc" by applying first the transition 40 from the state 42 to the state 44 to the first input letter "a". This emits "b", and then when applying the transition 46 from the state 44 to the state 48 on the second input letter "b", "c" is emitted. In the same way, T1 also transforms the word "b" into the word "d" through the transition 50. Thus T1 also defines locally the function T2 that takes any word as an input and outputs the same word, where all occurrences of "ab" and "b", the possible inputs of T1, have respectively been transformed into "bc" and "d". For instance, T2 takes the word "bbbbcccccabcccabccc" and transforms it into "ddddcccccbccccbcccc".

Figure 10:
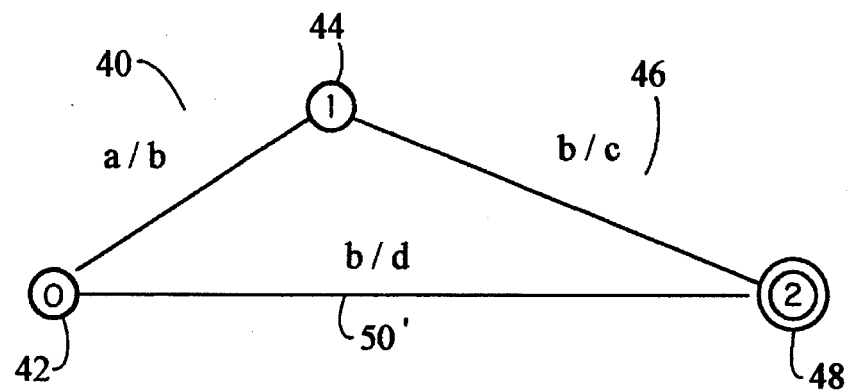
FIG. 10 is a diagram illustrating an example of finite state transducer defined locally that transforms "ab" into "bc" and "b" into "d".
Figure 11:
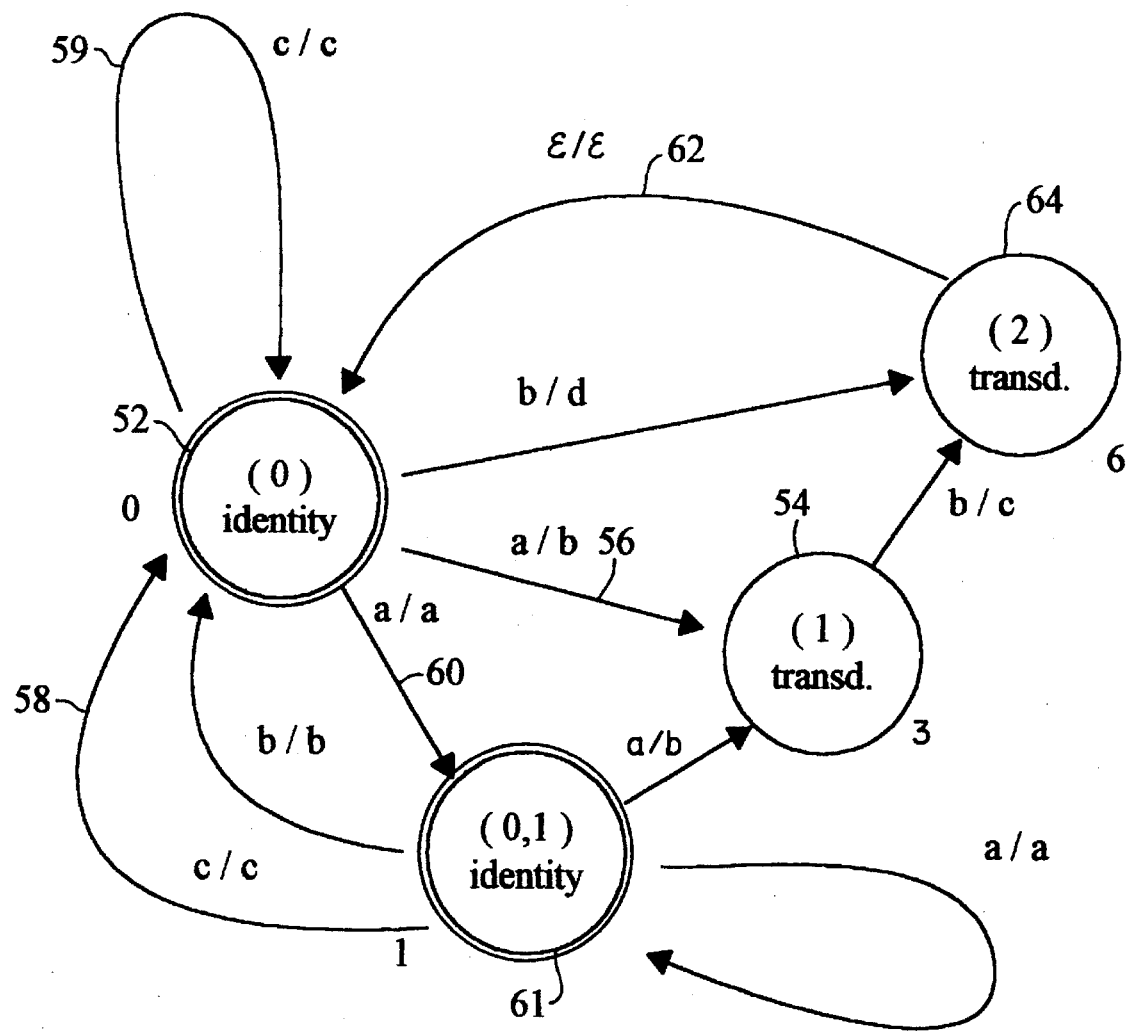
FIG. 11 is a diagram illustrating a finite state transducer defined globally equivalent to the one on FIG. 10 defined locally.

To compute this transformation as fast as possible, the best way is to precompile the representation of T1 of FIG. 10 into the representation of T2 of FIG. 11. The method is the following: the states of T2 are indexed by a set of states of T1 and by a type that is either transduction or identity. Thus states can either be of the transduction type or the identity type.

For instance, the state 0 as illustrated at 52 of FIG. 10 is indexed by the set of states {0} and is associated with the type identity. The type identity means that the input is kept unchanged, for instance the letter "c" of the input is never transformed. The transitions as illustrated at 58 and at 59 reflect this fact. The type transducer means that the function applies a modification of T1 as in the state illustrated at 54 where "a" has been transformed into "b" through the transition illustrated at 56 from the state illustrated at 52. This transition correspond to the transition illustrated at 40 of T1 from the state illustrated at 42 to the state illustrated at 44 in FIG. 10. From the initial state 52 one also has to consider the fact that an input letter "a" might be kept unchanged (has in the word "aa") and thus build the transition illustrated at 60 labeled "a/a". This transition points to the state illustrated at 61 whose type is identity, which indicates that the input has been kept unchanged up to this point. The state illustrated at 61 corresponds to the state 1 illustrated at 44 of T1 in FIG. 10 and also to the initial state 0 illustrated at 42 of T1 in FIG. 10. Hence, the state 1 illustrated at 61 in FIG. 11 is labeled by the set of states {0,1} and is associated with the type identity. The other transitions and states are built in the same way with the exception of the state illustrated at 64 in FIG. 11 which refers to the state 2 of T1 illustrated at 48 which is a final state. Final states are depicted with a double circle. Being at a final state means that a transformation has been completed and that it is thus possible to return to the initial state. This is expressed by the transition illustrated at 62 labeled by "$\epsilon/\epsilon$" in FIG. 11. This means that one can go from state illustrated at 64 to the state illustrated at 52 by reading the empty string $\epsilon$ and by emitting the empty string $\epsilon$.

c) Determiniser

Figure 12:
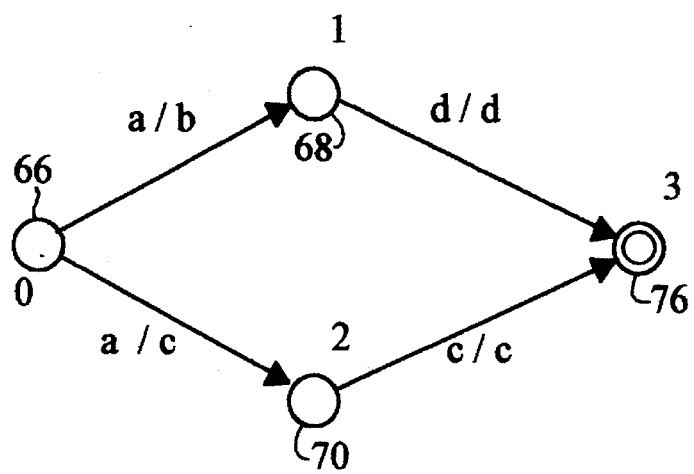
FIG. 12 is a diagram illustrating an example of finite state transducer which is not deterministic; and, FIG. 13 is a diagram illustrating the deterministic finite state transducer which is equivalent to the non-deterministic finite state transducer of FIG. 12.
Figure 13:
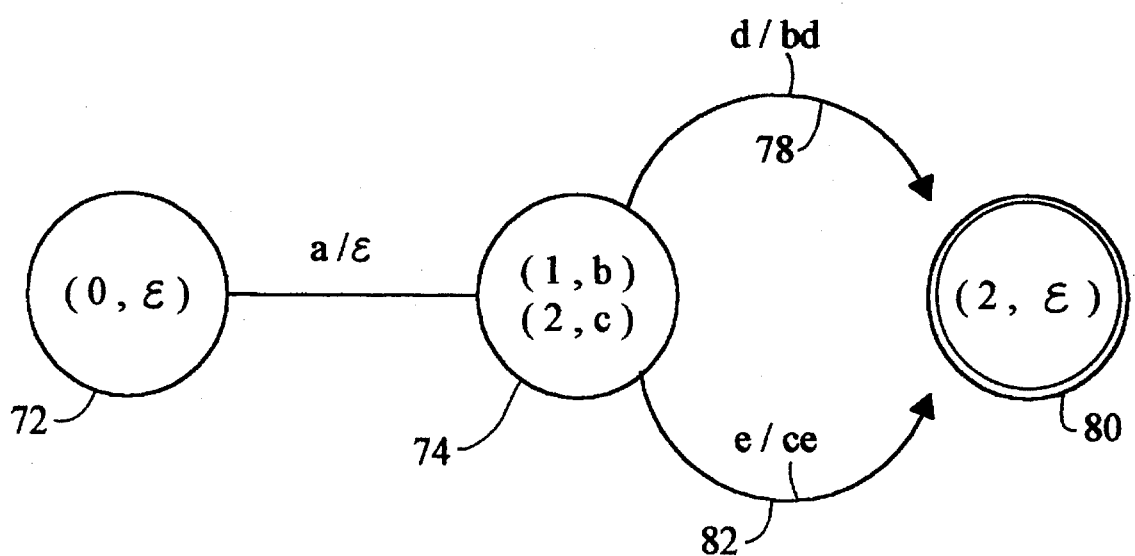

Having a Finite-State Transducer, one wants an equivalent Finite-State transducer that can be applied deterministically. In fact, one has a Finite-State Transducer such as T3 in FIG. 12. This transducer is not deterministic, in fact, suppose one wants to apply the input word "ad", the first input letter is "a", we thus start at the state 66 with two possibilities, the first one consists in going to state 68 by reading "a" and emitting "b" and the other consists in going to the state 70 by reading "a" too but emitting "c". Reading the second letter of the input, that is "d", shows that only the first choice was relevant to the actual input and that the final output is "bd". Having to handle this kind of choice coast a tremendous amount of time spending which shows the need for finite-state transducer for which one never has to choose between alternative propositions. Such Finite-State transducers are called deterministic. Building a deterministic transducer is done according to the following method. Suppose one has to deal with the transducer T3 described in FIG. 12, one builds the deterministic transducer T4 of FIG. 13 in the following way. One first builds the initial state 72 by saying that it contains the pair (0,$\epsilon$) in which 0 refers to the state 0 of T3 and $\epsilon$ to the fact that nothing, i.e. the empty word $\epsilon$, is to be emitted at this point. The only input symbol that can be read at the state 0 of T3 is "a". Thus there will be only one output transition at the state 72. This only transition will be labeled with the input symbol "a". To determinize the output symbol, one looks at all the output symbols in T3, to obtain "b" and "c" which means that one cannot yet determine for sure what has to be emitted. Therefore nothing (i.e.$\epsilon$) is emitted and the postponed emissions are stored in the arrival state 74. In this state (74), (1,b) means that one could be in state 1 of T3 (i.e. $\epsilon$) with "b" as postponed emission and (2,c) means that one could be in state 2 of T3 (70) with "c" as postponed emission. From this last state 74, since it corresponds to either 68 or 70, two input symbols are possible, namely "d" for 68 and "e" for 70. For the symbol "d", the corresponding state is 1 of T3 (68) which means, according to the pair (1,b) stored in 74, that the postponed symbol was "b". The output symbol for "d" between 68 and 76 is "d". Thus, putting together the postponed symbol with the newly emitted symbol, it will be appreciated that the emission of 78 should be "bd". Moreover, there is no reason to postpone any emission. Therefore the arrival state of 78 should be 80 labeled with state 2 of T3 and the empty string as a postponed symbol. In similar way, the emission for the symbol "e" from the state 74 should be "ce". In this case too, no postponed symbol is required. Thus the arrival state should also be labeled by (2, $\epsilon$), thus the arrival state of the transition 82 is 80 as well. This completes the construction of the deterministic finite-state transducer T4. This transducer is equivalent to T3 in the sense that they perform the same transformation on their input (for instance "ad" is transformed into "bd" both by T3 and T4). However, because it is deterministic, applying T4 can be done much faster than applying T3. The program for performing the tagging described above is now presented.

(LocalExtension)

```
/*------------------------------------------------------
            LocExt.c
        LOCAL EXTENSION TRANSFORMER program to compute de local extension: runs in the following way:

prog -epsi "<E>" -interog2 "???" <trans1 >loc-ext-of-trans1 where trans1 is the input transducer and loc-ext-trans1 the output

---------------------------------------------------*/ define OUI -19
define NON -18
#define C1 26
#define C2 253
#define C3 252
#define FIN_ETAT 65001
#define FIN_AUT 65000
#define SS_TRANS -1
#define ETT 30
#define TERMINAL 5
#define NON_TERMINAL 0
#define TROU 64999
#define TRS_FIN '$'
#define ETT2 -1
#define FIN_LONG 10000000
#define FIN_SHORT 65002
#define LONG_OUT 100000000
#define FIN_CHAR 255
#define SS_T '&'
define SS_T2 -2 typedef struct strcel22 {
    unsigned int g;
    unsigned int d;
    } CEL22;
#define TAILLE_CEL22 (2*sizeof(int))

typedef struct st_ilst {
    int entier;
    struct st_ilst *suivant;
        } *I_LISTE;
#define TAILLE_ILISTE (sizeof(int) + sizeof(I_LISTE))

typedef struct st_ilst_l {
    long entier;
```

(LocalExtension)

```
        struct st_ilst_l *suivant;
            } *L_LISTE;
#define TAILLE_LLISTE (sizeof(long) + sizeof(L_LISTE))

typedef union {
    unsigned char str[4];
    unsigned long l;
    } UBLOC;
#define TAILLE_UBLOC (sizeof(long))

typedef union {
    unsigned char str[2];
    unsigned short i;
    } IBLOC;

typedef union {
    unsigned short i;
    struct {
    unsigned int a0:1;
    unsigned int a1:15;
    } s;

} BBLOC;

typedef struct str2_cell{
        int cel_d;
        int cel_g;
        struct str2_cell *suivant;
            } *CELL2;
#define TAILLE_CELL2 (2*sizeof(int)+sizeof(CELL2))

typedef struct str4_cell {
        unsigned long cel_d;
        unsigned long cel_g;
        struct str4_cell *suivant;
            } *CELL44;
#define TAILLE_CELL44 (2*sizeof(long)+sizeof(CELL44))

typedef struct str4_cellt {
        unsigned long cel_d;
        unsigned long cel_g1;
        unsigned long cel_g2;
        struct str4_cellt *suivant;
                            } *CELLT44;
#define TAILLE_CELLT44 (3*sizeof(long)+sizeof(CELLT44))

typedef struct str3_cellt {
        UBLOC nombre;
        unsigned long cel_g2;
        struct str3_cellt *suivant;
                            } *CELLT13;
```

*16:48 Jun 16 1994*

(LocalExtension)

```
#define TAILLE_CELLT13 (2*sizeof(long)+sizeof(CELLT13))

typedef struct s_cell13{
    UBLOC nombre;
    struct s_cell13 *suivant;
    } *CELL13;
define TAILLE_CELL13 16 typedef union {
    unsigned short i;
    struct {
#ifndef INV
    unsigned int a0:1;
    unsigned int a1:15;
#else
    unsigned short a1:15;
    unsigned short a0:1;
#endif
    } s;

} BF;
#define TAILLE_BF (sizeof(short))

typedef struct {
    unsigned long *tab1h;
    BF *tab2h;
    } *HASH2;
#define TAILLE_HASH2 (sizeof(short *)+sizeof(BF *))

typedef struct {
    unsigned long **f;
    unsigned long nb_elt;
    HASH2 hash;
            unsigned long *delete1;
            unsigned long *trdel1;
            unsigned long *delete2;
            unsigned long *trdel2;
    } *ENS_ENS_INT;
#define TAILLE_EEI (sizeof(long **)+sizeof(long)+sizeof(HASH2)+sizeof(long *)*4)

typedef struct {
    CELL13 liste;
    unsigned long sorte;
    } *ET_L13;
#define TAILLE_ETL13 (sizeof(CELL13)+sizeof(long))

typedef struct {
    ET_L13 *etats;
```

(LocalExtension)

```
        unsigned long nb_etat;
        unsigned long taille;
    } *AUT_L13;
#define TAILLE_AUTL13 (sizeof(ET_L13 *)+sizeof(long)*2)
define T_AUT_L13 48 typedef struct {
    UBLOC **etats;
    unsigned short *sorte_etats;
    unsigned long nb_etat;
    unsigned long taille;
    } *AUT_LT13;
#define TAILLE_AUTLT13 (sizeof(UBLOC **)+sizeof(short *)+2*sizeof(long))
define T_AUT_LT13 47 typedef struct {
    UBLOC *bloc;
    unsigned long nb_etat;
    unsigned long taille;
    } *AUT_D13;
#define TAILLE_AUTD13 (sizeof(UBLOC *)+sizeof(long)*2)
define T_AUT_D13 49 define TROU_D13 255
define SORTE_POS_D13 -1
define COD_SORTE_D13 254 typedef struct {
    unsigned long sorte;
    unsigned long carde;
    CELL13 liste;
    } *ET_E_L13;
#define TAILLE_ETEL13 (2*sizeof(long) + sizeof(CELL13))

typedef struct {
    unsigned long nb_etat;
    ET_E_L13 *etats;
    unsigned long nb_mot;
    } *AUT_E_L13;
#define TAILLE_AUTEL13 (2*sizeof(long)+sizeof(ET_E_L13 *))
define T_AUT_E_L13 78 typedef struct {
    unsigned short *sorte_etats;
    unsigned long *carde_etats;
    UBLOC **etats;
    unsigned long taille;
    unsigned long nb_etat;
```

(LocalExtension)

```
    unsigned long nb_mot;
  } *AUT_E_LT13;
#define TAILLE_AUTELT13 (sizeof(long *)*3)

typedef struct {
    UBLOC *bloc;
    unsigned long *cardt;
    unsigned long taille;
    unsigned long nb_etat;
    unsigned long nb_mot;
  } *AUT_T_D13;
#define TAILLE_AUTTD13 (sizeof(long)*3+sizeof(long *)+sizeof(UBLOC *))
define T_AUT_T_D13 85 typedef struct {
    AUT_E_LT13 aut1;
    AUT_L13 aut2;
    unsigned long nb_mot1;
    unsigned long nb_mot;
    unsigned char **mot2s;
  } *ALP_E_LT13;
#define TAILLE_ALPELT13 (sizeof(AUT_E_LT13)+sizeof(AUT_L13)+2*sizeof(long))
define T_ALPELT13 43 typedef struct {
    AUT_T_D13 aut1;
    unsigned int stat;
    AUT_L13 aut2;
    unsigned long nb_mot1;
    unsigned long nb_mot;
    unsigned char **mot2s;
    unsigned long taille;
  } *ALP_T_D13;
#define TAILLE_ALPTD13 (sizeof(AUT_T_D13)+sizeof(AUT_L13)+3*sizeof(long)+sizeof(int)+sizeof(char **))
define T_ALP_T_D13 44 typedef struct {
  AUT_L44 aut;
  unsigned long **f;
        TUBE_INTER_SYN tubes;
  } *RES_INTER_L44;
#define TAILLE_RESINTERL44 (sizeof(AUT_L44)+sizeof(long **)+sizeof(TUBE_INTER_SYN))
define T_INTER_L44 76 typedef struct {
    CELLT44 liste;
    unsigned long sorte;
  } *ET_T_L44;
```

(LocalExtension)

```
#define TAILLE_ETTL44 (sizeof(long)+sizeof(CELLT44))

typedef struct {
    ALP_E_LT13 alp1;
    ALP_T_D13 alp2;
    ET_T_L44 *etats;
    unsigned long nb_etat;
    unsigned long taille;
} *TRANS_L44;
#define TAILLE_TRANSL44 (sizeof(ALP_E_LT13)+sizeof(ALP_T_D13)+sizeof(ET_T_L44 *)+sizeof(long)*2)
#define T_TRANS_L44 157

AUT_L13 read_autl13(FILE *f)
{
    AUT_L13 aut;
    UBLOC ubl;
    unsigned char c;
    ET_L13 tr;
    unsigned long i;
    CELL13 l,l2;

c=fgetc(f);
    if (c!=T_AUT_L13)
    {
        fprintf(stderr,"le fichier n'est pas au bon format dans read_autl13\n");
        exit(0);
    } aut=(AUT_L13)malloc(TAILLE_AUTL13);

ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif aut->nb_etat=ubl.l;

aut->etats=(ET_L13 *)malloc((aut->nb_etat+1+RES_ET_L13)*sizeof(ET_L13));
    aut->etats[0]=(ET_L13)malloc((aut->nb_etat+RES_ET_L13)*TAILLE_ETL13);
    tr=aut->etats[0];
    if (aut->nb_etat>0)
        for(i=0;i<=(aut->nb_etat-1);i++)
        {
            aut->etats[i]=tr++;
        } ifndef INV
```

*16:48 Jun 16 1994*

(LocalExtension)

```
        ubl.str[0]=fgetc(f);
        ubl.str[1]=fgetc(f);
        ubl.str[2]=fgetc(f);                                                            320
        ubl.str[3]=fgetc(f);
#else
        ubl.str[3]=fgetc(f);
        ubl.str[2]=fgetc(f);
        ubl.str[1]=fgetc(f);
        ubl.str[0]=fgetc(f);
endif aut->etats[i]->sorte=ubl.l;                                                         330 ifndef INV
        ubl.str[0]=fgetc(f);
        ubl.str[1]=fgetc(f);
        ubl.str[2]=fgetc(f);
        ubl.str[3]=fgetc(f);
#else
        ubl.str[3]=fgetc(f);
        ubl.str[2]=fgetc(f);
        ubl.str[1]=fgetc(f);                                                            340
        ubl.str[0]=fgetc(f);
endif l=NULL;
    while(ubl.l!=FIN_LONG)
    {
      l2=(CELL13)malloc(TAILLE_CELL13);
      l2->nombre.l=ubl.l;
      l2->suivant=l;                                                                    350
      l=l2;

#ifndef INV
        ubl.str[0]=fgetc(f);
        ubl.str[1]=fgetc(f);
        ubl.str[2]=fgetc(f);
        ubl.str[3]=fgetc(f);
#else
        ubl.str[3]=fgetc(f);
        ubl.str[2]=fgetc(f);                                                            360
        ubl.str[1]=fgetc(f);
        ubl.str[0]=fgetc(f);
endif

} renv_cell13(&l);
    aut->etats[i]->liste=l;

}                                                                                       370
```

(LocalExtension)

```
  for(i=(aut->nb_etat);i<=(aut->nb_etat+RES_ET_L13-1);i++)
  {
    aut->etats[i]=tr++;
    aut->etats[i]->sorte=NON_TERMINAL;
    aut->etats[i]->liste=NULL;
  } return(aut);
}

AUT_T_D13 read_auttd13(FILE *f)
{
  unsigned long i;
  UBLOC ubl;
  unsigned char c;
  AUT_T_D13 aut;

c=fgetc(f);
  if (c!=T_AUT_T_D13)
  {
    fprintf(stderr,"Le fichier n'est pas au bon format dans read_autd13\n");
    exit(0);
  } aut=(AUT_T_D13)malloc(TAILLE_AUTTD13);

ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
  ubl.str[0]=fgetc(f);
endif aut->nb_etat=ubl.l;

ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
  ubl.str[0]=fgetc(f);
endif
```

*16:48 Jun 16 1994*   *Page 8 of LocalExtension*

(LocalExtension)

```
    aut->taille=ubl.l;

#ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif aut->nb_mot=ubl.l;

aut->bloc=(UBLOC *)malloc(aut->taille*TAILLE_UBLOC);
    aut->cardt=(unsigned long *)malloc(aut->taille*sizeof(long));

for(i=0;i<=(aut->taille-1);i++)
    {
#ifndef INV
        ubl.str[0]=fgetc(f);
        ubl.str[1]=fgetc(f);
        ubl.str[2]=fgetc(f);
        ubl.str[3]=fgetc(f);
#else
        ubl.str[3]=fgetc(f);
        ubl.str[2]=fgetc(f);
        ubl.str[1]=fgetc(f);
        ubl.str[0]=fgetc(f);
endif
        aut->bloc[i].l=ubl.l;
    } for(i=0;i<=(aut->taille-1);i++)
    {
#ifndef INV
        ubl.str[0]=fgetc(f);
        ubl.str[1]=fgetc(f);
        ubl.str[2]=fgetc(f);
        ubl.str[3]=fgetc(f);
#else
        ubl.str[3]=fgetc(f);
        ubl.str[2]=fgetc(f);
        ubl.str[1]=fgetc(f);
        ubl.str[0]=fgetc(f);
endif aut->cardt[i]=ubl.l;
    }
```

430

440

450

460

470

(LocalExtension)

```
    return(aut);

}

ALP_T_D13 read_alptd13(FILE *f)
{
  IBLOC ibl;
  UBLOC ubl;
  ALP_T_D13 alph;
  unsigned long i;
  unsigned char *ligne,c;

c=fgetc(f);
  if (c!=T_ALP_T_D13)
  {
    fprintf(stderr,"Le fichier n'est pas au bon format dans read_alptd13\n");
    exit(0);
  } alph=(ALP_T_D13)malloc(TAILLE_ALPTD13);

ifndef INV
  ibl.str[0]=fgetc(f);
  ibl.str[1]=fgetc(f);
#else
  ibl.str[1]=fgetc(f);
  ibl.str[0]=fgetc(f);
endif alph->stat=ibl.i;

c=fgetc(f);
  if ((ibl.i==0) && (c==T_AUT_T_D13))
  {
    alph->aut1=read_auttd13(f);
    fgetc(f);
  }
  else
    alph->aut1=NULL;

alph->aut2=read_autl13(f);

#ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
```

*16:48 Jun 16 1994*

(LocalExtension)

```
  ubl.str[0]=fgetc(f);
endif alph->nb_mot1=ubl.l;

ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
  ubl.str[0]=fgetc(f);
endif alph->nb_mot=ubl.l;

ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
  ubl.str[0]=fgetc(f);
endif alph->taille=ubl.l;

ifndef OS2
  alph->mot2s=(unsigned char **)malloc(alph->taille+100000*sizeof(char *));
  alph->mot2s[0]=(unsigned char *)malloc(alph->taille+100000*sizeof(char));
#else
  alph->mot2s=(unsigned char **)malloc(alph->taille+10000*sizeof(char *));
  alph->mot2s[0]=(unsigned char *)malloc(alph->taille+10000*sizeof(char));
endif ligne=alph->mot2s[0];
  if (alph->nb_mot>alph->nb_mot1)
  {
    for(i=0;i<=(alph->nb_mot-alph->nb_mot1-1);i++)
    {
      alph->mot2s[i]=ligne;
      c=fgetc(f);
      while(c!='\0')
      {
        *ligne++=c;
        c=fgetc(f);
      }
```

(LocalExtension)

```
      *ligne++='\0';
    }
  } return(alph);

}

TRANS_L44 init_transl44(unsigned long nbetat)
{
  TRANS_L44 aut;
  ET_T_L44 tr;
  unsigned long i;

aut=(TRANS_L44)malloc(TAILLE_TRANSL44);
  aut->alp1=NULL;
  aut->alp2=NULL;
  aut->nb_etat=0;
  aut->taille=nbetat;

aut->etats=(ET_T_L44 *)malloc(nbetat*sizeof(ET_T_L44));
  aut->etats[0]=(ET_T_L44)malloc(nbetat*TAILLE_ETTL44);
  tr=aut->etats[0];

for(i=0;i<=(nbetat-1);i++)
  {
    aut->etats[i]=tr++;
    aut->etats[i]->sorte=0;
    aut->etats[i]->liste=NULL;
  } return(aut);
}

TRANS_L44 read_transl44(FILE *f)
{
  TRANS_L44 aut;
  UBLOC ubl;
  unsigned char c;
  ET_T_L44 tr;
  unsigned long i,nbetat,taille;
  CELLT44 l,l2;
  ALP_T_D13 alp2;

c=fgetc(f);
  if (c!=T_TRANS_L44)
  {
    fprintf(stderr,"le fichier n'est pas au bon format dans read_transl44\n");
    exit(0);
  } alp2=NULL;
```

```
    c=fgetc(f);
    if (c==T_ALP_T_D13)
    {
        alp2=read_alptd13(f);
    } ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif nbetat=ubl.l;

ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif taille=ubl.l;

aut=init_transl44(nbetat);
    aut->nb_etat=nbetat;
    aut->taille=taille;
    aut->alp1=NULL;
    aut->alp2=alp2;

if (aut->nb_etat>0)
    for(i=0;i<=(aut->nb_etat-1);i++)
    {
#ifndef INV
        ubl.str[0]=fgetc(f);
        ubl.str[1]=fgetc(f);
        ubl.str[2]=fgetc(f);
        ubl.str[3]=fgetc(f);
#else
        ubl.str[3]=fgetc(f);
        ubl.str[2]=fgetc(f);
```

(LocalExtension)

640

650

660

670

680

(LocalExtension)

```
        ubl.str[1]=fgetc(f);
        ubl.str[0]=fgetc(f);
endif aut->etats[i]->sorte=ubl.l;

ifndef INV
        ubl.str[0]=fgetc(f);
        ubl.str[1]=fgetc(f);
        ubl.str[2]=fgetc(f);
        ubl.str[3]=fgetc(f);                                           700
#else
        ubl.str[3]=fgetc(f);
        ubl.str[2]=fgetc(f);
        ubl.str[1]=fgetc(f);
        ubl.str[0]=fgetc(f);
endif l=NULL;
    while(ubl.l!=FIN_LONG)                                             710
    {
        l2=(CELLT44)malloc(TAILLE_CELLT44);
        l2->cel_g1=ubl.l;
        l2->suivant=l;
        l=l2;

#ifndef INV
        ubl.str[0]=fgetc(f);
        ubl.str[1]=fgetc(f);
        ubl.str[2]=fgetc(f);                                           720
        ubl.str[3]=fgetc(f);
#else
        ubl.str[3]=fgetc(f);
        ubl.str[2]=fgetc(f);
        ubl.str[1]=fgetc(f);
        ubl.str[0]=fgetc(f);
endif
        l2->cel_g2=ubl.l;

730
#ifndef INV
        ubl.str[0]=fgetc(f);
        ubl.str[1]=fgetc(f);
        ubl.str[2]=fgetc(f);
        ubl.str[3]=fgetc(f);
#else
        ubl.str[3]=fgetc(f);
        ubl.str[2]=fgetc(f);
        ubl.str[1]=fgetc(f);
        ubl.str[0]=fgetc(f);                                           740
#endif
        l2->cel_d=ubl.l;
```

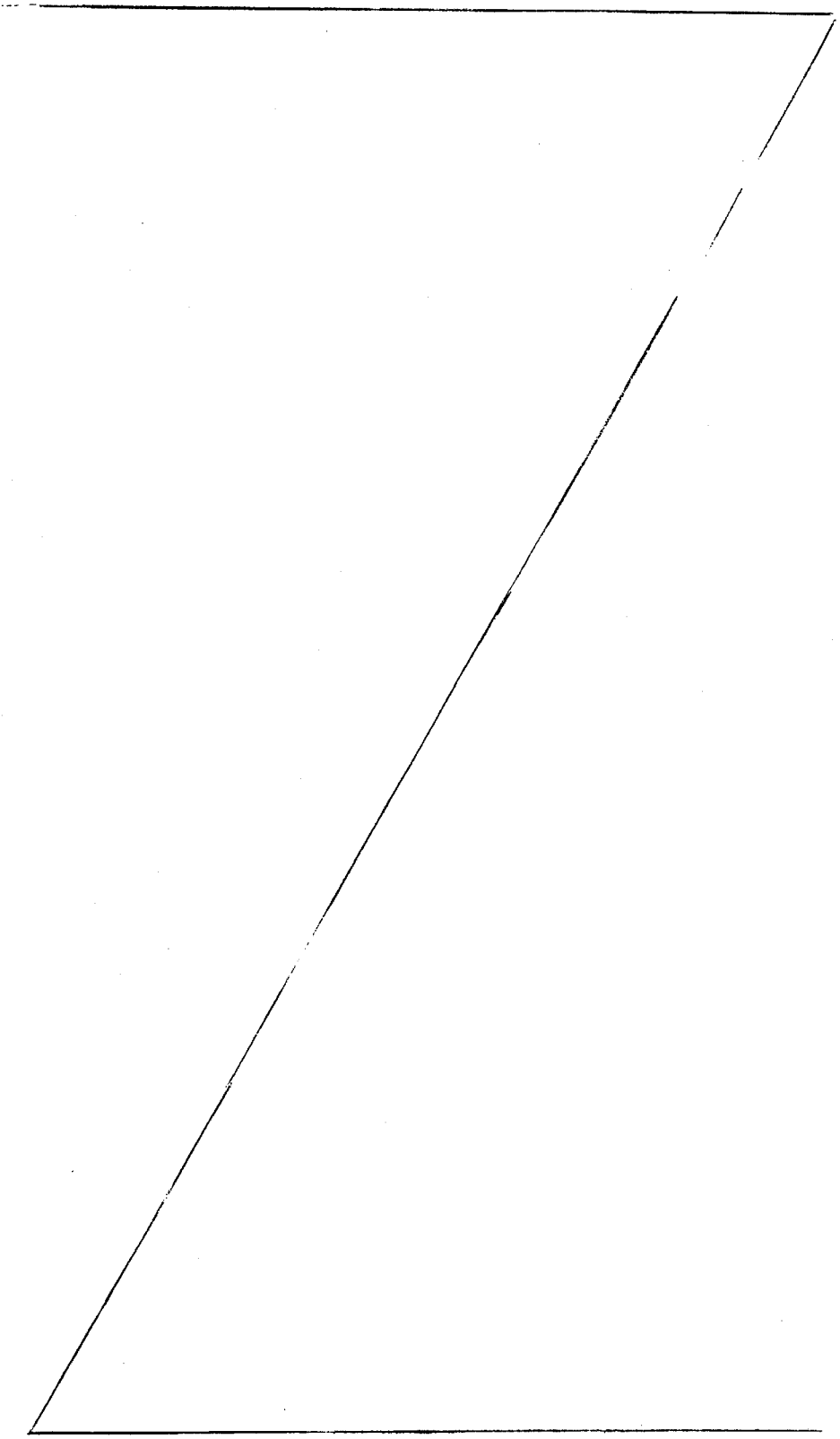

(LocalExtension)

```
#ifndef INV
      ubl.str[0]=fgetc(f);
      ubl.str[1]=fgetc(f);
      ubl.str[2]=fgetc(f);
      ubl.str[3]=fgetc(f);
#else
      ubl.str[3]=fgetc(f);
      ubl.str[2]=fgetc(f);
      ubl.str[1]=fgetc(f);
      ubl.str[0]=fgetc(f);
endif

} renv_cellt44(&l);
    aut->etats[i]->liste=l;

} return(aut);
}
ENS_ENS_INT init_eei(long borne)
{
  ENS_ENS_INT ens;
  unsigned long *tab1h;
  BF *tab2h;
  unsigned long il;

ens=(ENS_ENS_INT)malloc(TAILLE_EEI);

ens->f=(unsigned long **)malloc(borne*sizeof(long *));
  ens->f[0]=(unsigned long *)malloc(borne*10*sizeof(long));

ens->hash=(HASH2)malloc(TAILLE_HASH2);

tab1h=(unsigned long *)malloc(MAX_HASH1*sizeof(long));
  for(il=0;il<=(MAX_HASH1-1);il++)
    tab1h[il]=LONG_OUT;

tab2h=(BF *)malloc(sizeof(short)*MAX_HASH2);
  for(il=0;il<=(MAX_HASH2-1);il++)
    tab2h[il].i=0;

ens->hash->tab1h=tab1h;
  ens->hash->tab2h=tab2h;

ens->delete1=(unsigned long *)malloc(sizeof(long)*(borne+1));
  ens->trdel1=ens->delete1;
```

(LocalExtension)

```
    ens->trdel1[0]=FIN_LONG;
    ens->delete2=(unsigned long *)malloc(sizeof(long)*(borne*2+1));
    ens->trdel2=ens->delete2;
    ens->trdel2[0]=FIN_LONG;                                                      800 ens->nb_elt=0;

return(ens);

}

BINARY_TREE init_tas(unsigned long borne){
    BINARY_TREE bt;
    unsigned long *tab,i;                                                         810 bt=(BINARY_TREE)malloc(TAILLE_BINARYTREE);

bt->nbelt=0;
    bt->maxelt=borne/2;
    bt->tab=(unsigned long *)malloc(borne*sizeof(long));
    tab=bt->tab;
    for(i=0;i<=(borne-1);i++)
        tab[i]=LONG_OUT;
                                                                                  820
    return(bt);
}

TRANS_L44 locext_tl44(TRANS_L44 trans1,unsigned long interog2,unsigned long epsi)
{
    TRANS_L44 trans2;
    ENS_ENS_INT ens;
    unsigned long max_et,*yy,*tab,**tab_clot_epsi;
    BINARY_TREE bt;
                                                                                  830
    if (newmax==LONG_OUT)
        max_et=10000;
    else
        max_et=newmax;

ens=init_eei(max_et);
    bt=init_tas(MAX_TAS);
    yy=(unsigned long *)malloc(sizeof(long)*max_et);
    tab=(unsigned long *)malloc(sizeof(long)*max_et);
    tab_clot_epsi=(unsigned long **)malloc(sizeof(long)*trans1->nb_etat);
    tab_clot_epsi[0]=(unsigned long *)malloc(sizeof(long)*max_et);                840
    trans2=init_transl44(max_et);

locext_tl44_buff(trans2,trans1,interog2,epsi,ens,yy,bt,tab,tab_clot_epsi);

return trans2;
}
```

(LocalExtension)

```
void clot_epsi(TRANS_L44 trans,unsigned long *clot,unsigned long dep,unsigned long epsi){    850
    CELLT44 l;
    unsigned long i,j,q,n,arr,*tr;

clot[0]=dep;
    n=1;
    for(q=0;q<n;q++)
        {
            i=clot[q];
            for(l=trans->etats[i]->liste;l;l=l->suivant)
                {                                                                              860
                    if (l->cel_g1==epsi)
                        {
                            arr=l->cel_d;
                            tr=clot;
                            for(j=0;j<=q && arr!=clot[j];j++);

if ((j==q+1) && (arr!=i))
                                {
                                    clot[n]=arr;
                                    n++;                                                       870
                                }
                        }
                }
        }
    clot[n]=FIN_LONG;
} unsigned long *elt_eei(ENS_ENS_INT ens,unsigned long num)
{
    unsigned long *yy;                                                                         880 yy=ens->f[num];

return(yy);
} unsigned long in_add_eei(ENS_ENS_INT ens,unsigned long *yy)
{
    unsigned long num,fin,cmp;
    unsigned long *tr1,*tr2;                                                                   890
    long ind1,ind;
    BF ll;
    unsigned long *tab1h;
    BF *tab2h;
    unsigned long **f,*yy1;

tab1h=ens->hash->tab1h;
    tab2h=ens->hash->tab2h;
    f=ens->f;
                                                                                               900
    num=LONG_OUT;
```

(LocalExtension)

```
ind1=hd2(yy);
ind=ind1 / 16;
ll.i=tab2h[ind].i;
ind=ind1 % 16;
ll.i >>= ind;

if (ll.s.a0 == 1)
  {
    ind1=hd3(yy);                                                     910
    ind=ind1 / 16;
    ll.i=tab2h[ind].i;
    ind=ind1 % 16;
    ll.i >>= ind;

if (ll.s.a0 == 1)
       {
          ind=hd1(yy);

fin=NON;                                                      920
        while(fin!=OUI)
          {
            if (tab1h[ind]==LONG_OUT)
              {
                fin=OUI;
                *(ens->trdel1)++=ind;
                *(ens->trdel1)=FIN_LONG;
                tab1h[ind]=ens->nb_elt;
                num=ens->nb_elt;                                      930 if (num==0)
                   tr1=f[0];
                else
                   {
                      tr1=f[num-1];
                      while(*tr1!=FIN_LONG)
                         *tr1++;
                      *tr1++;
                   }                                                  940 f[num]=tr1;
                yy1=yy;
                while(*yy1!=FIN_LONG)
                   *tr1++=*yy1++;
                *tr1++=FIN_LONG;

ens->nb_elt+=1;
              }
            else                                                      950
              {
                tr1=f[tab1h[ind]];
                tr2=yy;
                cmp=1;
```

(LocalExtension)

```
            while(*tr1!=FIN_LONG)
              {
                if (*tr1++!=*tr2++)
                  cmp=0;
              }
            if(*tr2!=FIN_LONG)                                          960
              cmp=0;
            if (cmp==1)
              {
                fin=OUI;
                num=tab1h[ind];
              }
            ind+=1;
          }
      }
  }                                                                    970
else
  {
    ind1=hd3(yy);
    ind=ind1 % 16;
    ll.i=1;
    ll.i <<=ind;
    ind=ind1 / 16;
    *(ens->trdel2)++=ind;
    *(ens->trdel2)=FIN_LONG;
    tab2h[ind].i=tab2h[ind].i | ll.i;                                  980 ind=hd1(yy);
    while(tab1h[ind]!=LONG_OUT)
      ind+=1;

*(ens->trdel1)++=ind;
    *(ens->trdel1)=FIN_LONG;
    tab1h[ind]=ens->nb_elt;
    num=ens->nb_elt;
                                                                       990
    if (num==0)
      tr1=f[0];
    else
      {
        tr1=f[num-1];
        while(*tr1!=FIN_LONG)
          *tr1++;
        *tr1++;
      }
                                                                       1000
    f[num]=tr1;
    yy1=yy;
    while(*yy1!=FIN_LONG)
      *tr1++=*yy1++;
    *tr1++=FIN_LONG;

ens->nb_elt+=1;
```

```
            }
          }
        else
          {
            ind1=hd2(yy);                                      (LocalExtension)
            ind=ind1 % 16;
            ll.i=1;                                                      1010
            ll.i <<=ind;
            ind=ind1 / 16;
            *(ens->trdel2)++=ind;
            *(ens->trdel2)=FIN_LONG;
            tab2h[ind].i=tab2h[ind].i | ll.i;

ind1=hd3(yy);                                                1020
            ind=ind1 % 16;
            ll.i=1;
            ll.i <<=ind;
            ind=ind1 / 16;
            *(ens->trdel2)++=ind;
            *(ens->trdel2)=FIN_LONG;
            tab2h[ind].i=tab2h[ind].i | ll.i;

ind=hd1(yy);                                                 1030
            while(tab1h[ind]!=LONG_OUT)
              ind+=1;

*(ens->trdel1)++=ind;
            *(ens->trdel1)=FIN_LONG;
            tab1h[ind]=ens->nb_elt;
            num=ens->nb_elt;

if (num==0)
              tr1=f[0];                                                  1040
            else
              {
                tr1=f[num-1];
                while(*tr1!=FIN_LONG)
                  *tr1++;
                *tr1++;
              } f[num]=tr1;
            yy1=yy;                                                      1050
            while(*yy1!=FIN_LONG)
              *tr1++=*yy1++;
            *tr1++=FIN_LONG;

ens->nb_elt+=1;

} return(num);                                                     1060
```

(LocalExtension)

```
} void locext_tl44_buff(
            TRANS_L44 trans2,
            TRANS_L44 trans1,
            unsigned long interog2,
            unsigned long epsi,
            ENS_ENS_INT ens,
            unsigned long *yy,
            BINARY_TREE bt,
            unsigned long *tab,
            unsigned long **tab_clot_epsi)
{
  unsigned long n,q,arr,x1,poubelle,i;
  CELLT44 l,l2,l1;
  int fin,trouve,interog_trv;
  unsigned long *yy1,*tr,*tr1,*tr2,*tr3,*tr4,let,max_et;

if (newmax==LONG_OUT)
     max_et=10000;
  else
     max_et=newmax;

tr=tab_clot_epsi[0];
  for(i=0;i<=(trans1->nb_etat-1);i++){
     tab_clot_epsi[i]=tr;
     clot_epsi(trans1,tr,i,epsi);
     for(;*tr!=FIN_LONG;tr++);
     tr++;

}

*yy=0;
  tab[0]=1;
  yy[1]=FIN_LONG;
  in_add_eei(ens,yy);
  yy[0]=1;
  yy[1]=1;
  yy[2]=1;
  yy[3]=1;
  yy[4]=FIN_LONG;
  in_add_eei(ens,yy);
  poubelle=1;

n=2;
  q=0;
  do{
     yy1=elt_eei(ens,q);
     if (tab[q]==1)
        tab[q]=0;
```

(LocalExtension)

```
x1=*yy1;

if (trans1->etats[x1]->sorte!=NON_TERMINAL && x1!=0){
   trans2->etats[q]->sorte=trans1->etats[x1]->sorte;

l=trans1->etats[0]->liste;
   for(;l;l=l->suivant){                                                    1120
      let=l->cel_g1;
      for(l1=trans2->etats[q]->liste;l1 && l1->cel_g1!=let;l1=l1->suivant);

if (!l1 && let!=interog2 && let!=epsi){
         tas_add_elt(bt,0);
         fin=NON;
         for(l1=l;l1 && fin==NON;l1=l1->suivant){
            if (l1->cel_g1==let){
               if (trans1->etats[l1->cel_d]->sorte!=NON_TERMINAL)
                  fin=OUI;                                                  1130
               else
                  tas_add_elt(bt,l->cel_d);
            }
         } interog_trv=NON;
         trouve=NON;
         for(l1=trans1->etats[x1]->liste;l1 && fin==NON;l1=l1->suivant){
            if (l1->cel_g1==let){
               trouve=OUI;
               if (trans1->etats[l1->cel_d]->sorte!=NON_TERMINAL)           1140
                  fin=OUI;
               else
                  tas_add_elt(bt,l1->cel_d);
            }
            else if (l1->cel_g1==interog2)
               interog_trv=OUI;
         }
         if (trouve==NON && interog_trv==OUI){
            for(l1=trans1->etats[x1]->liste;l1 && fin==NON;l1=l1->suivant){ 1150
               if (l1->cel_g1==interog2){
                  if (trans1->etats[l1->cel_d]->sorte!=NON_TERMINAL)
                     fin=OUI;
                  else
                     tas_add_elt(bt,l1->cel_d);
               }
            }
         }
         tas_yy(yy,bt);
         if (fin==NON){                                                     1160
            arr=(unsigned long)in_add_eei(ens,yy);
            if (arr>=n){
               n+=1;
               if (n>=max_et){
                  fprintf(stderr,"error 0 locext_t144_buff _manip27\n");
                  fprintf(stderr,"To many states, the maximum number is %ld\n",max_et);
```

(LocalExtension)

```
            exit(0);
        }
    }
    add_tr_tl44_undet(trans2,q,let,let,arr,NULL);                                      1170
    }
  }
} l2=trans1->etats[x1]->liste;
for(;l2;l2=l2->suivant){
    let=l2->cel_gl;
    for(l1=trans2->etats[q]->liste;l1 && l1->cel_gl!=let;l1=l1->suivant);

if (!l1 && let!=interog2 && let!=epsi){                                            1180
        fin=NON;
        tas_add_elt(bt,0);
        for(l1=l2;l1 && fin!=OUI;l1=l1->suivant){
            if (l1->cel_gl==let){
                if (trans1->etats[l1->cel_d]->sorte!=NON_TERMINAL)
                    fin=OUI;
                else
                    tas_add_elt(bt,l1->cel_d);
            }
        }
        for(l1=trans1->etats[0]->liste;l1 && fin==NON;l1=l1->suivant){                 1190
            if (l1->cel_gl==let)
                {
                if (trans1->etats[l1->cel_d]->sorte!=NON_TERMINAL)
                    fin=OUI;
                else
                    tas_add_elt(bt,l1->cel_d);
                }
        }
        tas_yy(yy,bt);                                                                  1200
        if (fin==NON){
            arr=(unsigned long)in_add_eei(ens,yy);
            if (arr>=n){
                n+=1;
                if (n>=max_et){
                    fprintf(stderr,"error 0 locext_tl44_buff _manip27\n");
                    fprintf(stderr,"To many states, the maximum number is %ld\n",max_et);
                    exit(0);
                }
            }                                                                           1210
            add_tr_tl44_undet(trans2,q,let,let,arr,NULL);

}

}
} fin=NON;
tas_add_elt(bt,0);
```

(LocalExtension)

```
for(l1=trans1->etats[0]->liste;l1 && fin==NON; l1=l1->suivant){
   if (l1->cel_g1==interog2){
      for(tr=tab_clot_epsi[l1->cel_d];*tr!=FIN_LONG && fin==NON;tr++)
         {
            if (trans1->etats[*tr]->sorte!=NON_TERMINAL)
               fin=OUI;
         }
      if (fin==NON)
         tas_add_elt(bt,l1->cel_d);
   }
}
for(l1=trans1->etats[x1]->liste;l1 && fin==NON;l1=l1->suivant){
   if (!l1->cel_g1==interog2){
      for(tr=tab_clot_epsi[l1->cel_d];*tr!=FIN_LONG && fin==NON;tr++)
         {
            if (trans1->etats[*tr]->sorte!=NON_TERMINAL)
               fin=OUI;
         }
      if (fin==NON)
         tas_add_elt(bt,l1->cel_d);
   }
}
tas_yy(yy,bt);
if (fin==NON){
   arr=(unsigned long)in_add_eei(ens,yy);
   if (arr>=n){
      n+=1;
      if (n>=max_et){
         fprintf(stderr,"error 0 locext_tl44_buff _manip27\n");
         fprintf(stderr,"To many states, the maximum number is %ld\n",max_et);
         exit(0);
      }
   }
   add_tr_tl44_undet(trans2,q,interog2,interog2,arr,NULL);

} interog_trv=NON;
for(l=trans1->etats[0]->liste;l;l=l->suivant){
   if (l->cel_g1==interog2)
      interog_trv=OUI;

yy[0]=l->cel_d;
   yy[1]=FIN_LONG;
   arr=(unsigned long)in_add_eei(ens,yy);
   if (arr>=n){
      n+=1;
      tab[arr]=1;
      if (n>=max_et){
         fprintf(stderr,"error 0 locext_tl44_buff _manip27\n");
         fprintf(stderr,"To many states, the maximum number is %ld\n",max_et);
```

(LocalExtension)

```
            exit(0);
         }
      }
      add_tr_tl44_undet(trans2,q,l->cel_g1,l->cel_g2,arr,NULL);

} if (interog_trv==OUI){                                                           1280
      for(l2=trans1->etats[x1]->liste;l2;l2=l2->suivant){
         let=l2->cel_g1;
         if (let!=interog2 && let!=epsi){
            for(l=trans1->etats[0]->liste;l && l->cel_g1!=let;l=l->suivant);

if (!l){
               for(l=trans1->etats[0]->liste;l;l=l->suivant){
                  if (l->cel_g1==interog2){
                     yy[0]=l->cel_d;
                     yy[1]=FIN_LONG;                                                1290
                     arr=(unsigned long)in_add_eei(ens,yy);
                     if (arr>=n){
                        n+=1;
                        tab[arr]=1;
                        if (n>=max_et)
                           {
                           fprintf(stderr,"error 0 locext_tl44_buff _manip27\n");
                           fprintf(stderr,"To many states, the maximum number is %ld\n",max_et);
                           exit(0);
                           }                                                        1300
                     }
                     if (l->cel_g2==interog2)
                        add_tr_tl44_undet(trans2,q,let,let,arr,NULL);
                     else
                        add_tr_tl44_undet(trans2,q,let,l->cel_g2,arr,NULL);
                  }
               }
            }
         }
      }                                                                             1310
   } interog_trv=NON;
   for(l=trans1->etats[x1]->liste;l;l=l->suivant){
      if (l->cel_g1==interog2)
         interog_trv=OUI;

yy[0]=l->cel_d;
      yy[1]=FIN_LONG;
      arr=(unsigned long)in_add_eei(ens,yy);                                        1320
      if (arr>=n){
         n+=1;
         tab[arr]=1;
         if (n>=max_et){
            fprintf(stderr,"error 0 locext_tl44_buff _manip27\n");
```

(LocalExtension)

```
            fprintf(stderr,"To many states, the maximum number is %ld\n",max_et);
            exit(0);
         }
      }
      add_tr_tl44_undet(trans2,q,l->cel_g1,l->cel_g2,arr,NULL);                          1330

} if (interog_trv==OUI){
      for(l2=trans1->etats[0]->liste;l2;l2=l2->suivant){
         let=l2->cel_g1;
         if (let!=interog2 && let!=epsi){
            for(l=trans1->etats[x1]->liste;l && l->cel_g1!=let;l=l->suivant);

if (!l){                                                                    1340
               for(l=trans1->etats[x1]->liste;l;l=l->suivant){
                  if (l->cel_g1==interog2){
                     yy[0]=l->cel_d;
                     yy[1]=FIN_LONG;
                     arr=(unsigned long)in_add_eei(ens,yy);
                     if (arr>=n){
                        n+=1;
                        tab[arr]=1;
                        if (n>=max_et){
                           fprintf(stderr,"error 0 locext_tl44_buff _manip27\n");        1350
                           fprintf(stderr,"To many states, the maximum number is %ld\n",max_et);
                           exit(0);
                        }
                     }
                     if (l->cel_g2==interog2)
                        add_tr_tl44_undet(trans2,q,let,let,arr,NULL);
                     else
                        add_tr_tl44_undet(trans2,q,let,l->cel_g2,arr,NULL);
                  }
               }                                                                        1360
            }
         }
      }
   }

}
else if (x1==0){
   trans2->etats[q]->sorte=TERMINAL;
                                                                                        1370 for(tr=tab_clot_epsi[0];*tr!=FIN_LONG;tr++){
      l=trans1->etats[*tr]->liste;
      for(;l;l=l->suivant){
         let=l->cel_g1;
         for(l1=trans2->etats[q]->liste;l1 && l1->cel_g1!=let;l1=l1->suivant);

if (!l1 && let!=interog2 && let!=epsi){
```

(LocalExtension)

```
            tas_add_elt(bt,0);
            fin=NON;

for(ll=l;ll && fin==NON;ll=ll->suivant){
              if (ll->cel_gl==let){
                if (trans1->etats[ll->cel_d]->sorte!=NON_TERMINAL)
                  fin=OUI;
                else
                  tas_add_elt(bt,l->cel_d);
              }
            }
            for(tr1=&(tr[1]);*tr1!=FIN_LONG;tr1++){
              for(ll=trans1->etats[*tr1]->liste;ll;ll=ll->suivant){
                if (ll->cel_gl==let){
                  if (trans1->etats[ll->cel_d]->sorte!=NON_TERMINAL)
                    fin=OUI;
                  else
                    tas_add_elt(bt,l->cel_d);
                }
              }
            }
            tas_yy(yy,bt);
            if (fin==NON){
              arr=(unsigned long)in_add_eei(ens,yy);
              if (arr>=n){
                n+=1;
                if (n>=max_et){
                  fprintf(stderr,"error 0 locext_tl44_buff _manip27\n");
                  fprintf(stderr,"To many states, the maximum number is %ld\n",max_et);
                  exit(0);
                }
              }
              add_tr_tl44_undet(trans2,q,let,let,arr,NULL);
            }
            else
              add_tr_tl44_undet(trans2,q,let,let,poubelle,NULL);
          }
        }
      } fin=NON;
      tas_add_elt(bt,0);
      for(ll=trans1->etats[0]->liste;ll && fin==NON; ll=ll->suivant){
        if (ll->cel_gl==interog2){
          if (trans1->etats[ll->cel_d]->sorte!=NON_TERMINAL)
            fin=OUI;
          else
            tas_add_elt(bt,ll->cel_d);
        }
      }
      tas_yy(yy,bt);
      if (fin==NON){
```

(LocalExtension)

```
      arr=(unsigned long)in_add_eei(ens,yy);
      if (arr>=n){
        n+=1;
        if (n>=max_et){
          fprintf(stderr,"error 0 locext_tl44_buff _manip27\n");
          fprintf(stderr,"To many states, the maximum number is %ld\n",max_et);
          exit(0);
        }
      }
      add_tr_tl44_undet(trans2,q,interog2,interog2,arr,NULL);                      1440

} interog_trv=NON;
    for(l=trans1->etats[0]->liste;l;l=l->suivant){
      if (l->cel_g1==interog2)
        interog_trv=OUI;
                                                                                    1450
      yy[0]=l->cel_d;
      yy[1]=FIN_LONG;
      arr=(unsigned long)in_add_eei(ens,yy);
      if (arr>=n){
        n+=1;
        tab[arr]=1;
        if (n>=max_et){
          fprintf(stderr,"error 0 locext_tl44_buff _manip27\n");
          fprintf(stderr,"To many states, the maximum number is %ld\n",max_et);
          exit(0);                                                                  1460
        }
      }
      add_tr_tl44_undet(trans2,q,l->cel_g1,l->cel_g2,arr,NULL);

}

}
  else{
    for(l=trans1->etats[x1]->liste;l;l=l->suivant){                                 1470
      yy[0]=l->cel_d;
      yy[1]=FIN_LONG;
      arr=(unsigned long)in_add_eei(ens,yy);

if (arr>=n){
        n+=1;
        tab[arr]=1;
        if (n>=max_et){
          fprintf(stderr,"error 0 locext_tl44_buff _manip27\n");
          fprintf(stderr,"To many states, the maximum number is %ld\n",max_et);     1480
          exit(0);
        }
      }
```

(LocalExtension)

```
            add_tr_tl44_undet(trans2,q,l->cel_g1,l->cel_g2,arr,NULL);
        }
    }

}
else                                                                            1490
    trans2->etats[q]->sorte=TERMINAL;

for(tr=yy1;*tr!=FIN_LONG;tr++){
    for(tr1=tab_clot_epsi[*tr];*tr1!=FIN_LONG;*tr1++){
        l=trans1->etats[*tr1]->liste;
        for(;l;l=l->suivant)
            {
                let=l->cel_g1;
                                                                                1500 l2=trans2->etats[q]->liste;
                for(;l2 && l2->cel_g1!=let;l2=l2->suivant);

if (!l2 && let!=interog2 && let!=epsi)
                    {
                        fin=NON;
                        tas_add_elt(bt,0);

if (l->cel_g1!=interog2)                                1510
                            {
                                let=l->cel_g1;
                                l1=l;
                                for(;l1 && fin==NON;l1=l1->suivant)
                                    {
                                        if (l1->cel_g1==let)
                                            {
                                                for(tr2=tab_clot_epsi[l1->cel_d];*tr2!=FIN_LONG && fin==NON;tr2++)
                                                    {
                                                        if (trans1->etats[*tr2]->sorte!=NON_TERMINAL)   1520
                                                            fin=OUI;
                                                    }
                                                tas_add_elt(bt,l1->cel_d);
                                            }
                                    }
                                for(tr2=tr;(*tr2!=FIN_LONG) && (fin==NON);tr2++)
                                    {
                                        for(tr3=tab_clot_epsi[*tr2];*tr3!=FIN_LONG;*tr3++)
                                            {
                                                l1=trans1->etats[*tr3]->liste;                  1530
                                                trouve=NON;
                                                interog_trv=NON;
                                                for(;l1 && fin==NON;l1=l1->suivant)
                                                    {
                                                        if (l1->cel_g1==let)
                                                            {
                                                                trouve=OUI;
```

(LocalExtension)

```
                        for(tr4=tab_clot_epsi[l1->cel_d];*tr4!=FIN_LONG && fin==NON;tr4++)
                           {
                              if (trans1->etats[*tr4]->sorte!=NON_TERMINAL)    1540
                                 fin=OUI;
                           } tas_add_elt(bt,l1->cel_d);
                        if (trans1->etats[l1->cel_d]->sorte!=NON_TERMINAL)
                           fin=OUI;

}
                  else if (l1->cel_g1==interog2)
                     interog_trv=OUI;                                            1550
               }
            }
         }
         tas_yy(yy,bt);
         if (fin==NON)
            {
               arr=(unsigned long)in_add_eei(ens,yy);
               if (arr>=n)
                  {
                     n+=1;                                                       1560
                     if (n>=max_et)
                        {
                           fprintf(stderr,"error 0 locext_tl44_buff _manip27\n");
                           fprintf(stderr,"To many states, the maximum number is %ld\n",max_et);
                           exit(0);
                        }
                  }
               add_tr_tl44_undet(trans2,q,let,let,arr,NULL);
            }
         else                                                                    1570
            add_tr_tl44_undet(trans2,q,let,let,poubelle,NULL);

}
   else
      {
         fin=NON;
         tas_add_elt(bt,0);

l1=l;                                                                   1580
         for(;l1 && fin==NON;l1=l1->suivant)
            {
               if (l1->cel_g1==interog2)
                  {
                     tas_add_elt(bt,l1->cel_d);

for(tr2=tab_clot_epsi[l1->cel_d];*tr2!=FIN_LONG && fin==NON;tr2++)
                        {
                           if (trans1->etats[*tr2]->sorte!=NON_TERMINAL)
                              fin=OUI;                                           1590
```

(LocalExtension)

```
              }
            }
          }
          for(tr1=tr;(*tr1!=FIN_LONG) && (fin==NON);tr1++)
            {
              l1=trans1->etats[*tr1]->liste;
              for(;l1 && fin==NON;l1=l1->suivant)
                {
                  if (l1->cel_g1==interog2)                                    1600
                    {
                      tas_add_elt(bt,l1->cel_d);

for(tr2=tab_clot_epsi[l1->cel_d];*tr2!=FIN_LONG && fin==NON;tr2++)
                        {
                          if (trans1->etats[*tr2]->sorte!=NON_TERMINAL)
                            fin=OUI;
                        }
                    }
                }                                                              1610
            }
          tas_yy(yy,bt);
          if (fin==NON)
            {
              arr=(unsigned long)in_add_eei(ens,yy);
              if (arr>=n)
                {
                  n+=1;
                  if (n>=max_et)
                    {                                                          1620
                      fprintf(stderr,"error 0 locext_tl44_buff _manip27\n");
                      fprintf(stderr,"To many states, the maximum number is %ld\n",max_et);
                      exit(0);
                    }
                }
              add_tr_tl44_undet(trans2,q,interog2,interog2,arr,NULL);
            }
        }
                                                                               1630
      }
    }
  }
} for(tr=yy1;*tr!=FIN_LONG;tr++)
  {
    for(tr1=tab_clot_epsi[*tr];*tr1!=FIN_LONG;tr1++)
      {                                                                        1640
        fin=NON;
        tas_add_elt(bt,0);
        for(l1=trans1->etats[*tr1]->liste;l1 && fin==NON; l1=l1->suivant)
```

(LocalExtension)

```
        {
          if (l1->cel_g1==interog2)
            {
              for(tr2=tab_clot_epsi[l1->cel_d];*tr2!=FIN_LONG && fin==NON;tr2++)
                {
                  if (trans1->etats[*tr2]->sorte!=NON_TERMINAL)
                    fin=OUI;                                                         1650
                } tas_add_elt(bt,l1->cel_d);
            }
        }
    }
}
tas_yy(yy,bt);
if (fin==NON)                                                                        1660
  {
    arr=(unsigned long)in_add_eei(ens,yy);
    if (arr>=n)
      {
        n+=1;
        if (n>=max_et)
          {
            fprintf(stderr,"error 0 locext_t144_buff _manip27\n");
            fprintf(stderr,"To many states, the maximum number is %ld\n",max_et);
            exit(0);                                                                 1670
          }
      }
    add_tr_t144_undet(trans2,q,interog2,interog2,arr,NULL);
  } interog_trv=NON;
for(l=trans1->etats[0]->liste;l;l=l->suivant)                                        1680
  {
    if (l->cel_g1==interog2)
      interog_trv=OUI;

yy[0]=l->cel_d;
    yy[1]=FIN_LONG;
    arr=(unsigned long)in_add_eei(ens,yy);

if (arr>=n)
      {                                                                              1690
        n+=1;
        if (n>=max_et)
          {
            fprintf(stderr,"error 0 f_transduc_144_t144 _manip21\n");
            fprintf(stderr,"To many states, the maximum number is %ld\n",max_et);
            exit(0);
```

```
            }
          }
        add_tr_tl44_undet(trans2,q,l->cel_g1,l->cel_g2,arr,NULL);

}

} if (q)
      q++;
    else
      q+=2;

} while(q<n);

trans2->alp2=trans1->alp2;
  trans2->nb_etat=n;
} unsigned long ord_alptd13(unsigned char *mot,ALP_T_D13 alph)
{
  unsigned long num;

if (alph->aut1!=NULL)
  {
    num=ord_auttd13(mot,alph->aut1);
    if (num==LONG_OUT)
    {
      num=in_autl13(mot,alph->aut2);
      if (num!=LONG_OUT)
        num-=1;
    }
  }
  else
  {
    num=in_autl13(mot,alph->aut2);
    if (num!=LONG_OUT)
      num-=1;
  } return(num);
} void add_mot_alptd13(ALP_T_D13 alph,unsigned char *mot)
{
  unsigned char *ligne,*lg2;
  L_LISTE l;

add_mot_l13(alph->aut2,mot,alph->nb_mot+1);
```

```
                                                          if-for(LocalExtension)
  if (alph->nb_mot==alph->nb_mot1)                                          if
  {                                                                      1750
    ligne=mot;
    lg2=alph->mot2s[0];
    while(*ligne!='\0')
       *lg2++=*ligne++;
    *lg2++='\0';
  }
  else
  {
    ligne=mot;
    lg2=alph->mot2s[alph->nb_mot-alph->nb_mot1-1];                         1760
    while(*lg2!='\0')
      *lg2++;
    *lg2++;
    alph->mot2s[alph->nb_mot-alph->nb_mot1]=lg2;
    while(*ligne!='\0')
       *lg2++=*ligne++;
    *lg2++='\0';
  } alph->nb_mot+=1;                                                         1770

} unsigned long ordaj_alptd13(ALP_T_D13 alph,unsigned char *mot)
{
  unsigned long num;

num=ord_alptd13(mot,alph);
  if (num==LONG_OUT)                                                        if
  {                                                                      1781
    num=alph->nb_mot;
    add_mot_alptd13(alph,mot);
  } return(num);
}

1790
void main(int nb,char **arg){
  unsigned long i;
  unsigned char *interog_ch,*epsilon,c;
  unsigned long epsi,interog2;
  int tp;
  TRANS_L44 trans1,trans2;

tp=0;
  epsilon=interog_ch=NULL;
  for(i=1;i<=(nb-1);i++)                                                   for
  {                                                                      1801
``` for-if(LocalExtension)

```
        if (strcmp(arg[i],"-epsi")==0)
           epsilon=(unsigned char *)arg[i+1];
        else if (strcmp(arg[i],"-interog2")==0)
           interog_ch=(unsigned char *)arg[i+1];
     } c=fgetc(stdin);
  if (c==T_TRANS_L44){                                                    if
     trans1=read_transl44(stdin);                                       1811 if (epsilon)
        epsi=ord_alptd13(epsilon,trans1->alp2);
     else
        epsi=ord_alptd13((unsigned char *)"<E>",trans1->alp2);

if  (interog_ch)
        interog2=ordaj_alptd13(trans1->alp2,interog_ch);
     else                                                               1820
        interog2=ordaj_alptd13(trans1->alp2,(unsigned char *)"???");

trans2=locext_tl44(trans1,interog2,epsi);

fec(T_TRANS_L44,stdout);

write_transl44(stdout,trans2);

}
  else                                                                  1830
     {
       fprintf(stderr,"The input file should be of type TRANS_L44\n");
       exit(0);
     }

}
```

(Determinizer)

```
/*------------------------------------------------
            determinize.c
    DETERMINIZE A TRANSDUCER INTO A SEQUENTIAL TRANSDUCER The functions and structure definitions shared with the local extension
transformer are described in the program LocalExtension
(Source code  describing the local extension transformer)
---------------------------------------------------*/ typedef struct {
   ALP_T_D13 alps;      /*alphabet of simple words*/
   unsigned long nb_mot;   /*total number of words*/
   unsigned long nb_mot1;  /*number of words in the indexed DAG*/
   AUT_E_L44 aut1;       /*indexed DAG prepresenting the first half of the set*/
   unsigned long nb_mot2;  /*number of words in the additional tree*/
   AUT_L44 abr2;         /*tree representing the additional strings*/
   unsigned long *tab1;    /*tab1[i] points to the position in tab2 that describes the
word i+nb_mot1*/
   unsigned long *tab2;    /*contains the strings in the form of list of long (each long
being a reference to an actual word in alps*/
   unsigned long postab2; /*points to the position in tab2 at which the next sequence has to be included*/
} *ALP4;
#define TAILLE_ALP4 (sizeof(long)*4+sizeof(long *)*2+sizeof(ALP_T_D13)+sizeof(AUT_L44)+sizeof(AUT_E_
#define T_ALP4 177
#define DEF_NBSTATE_S 10000
/*default number of states in the tree of the simple word subalphabet*/
#define DEF_NBWORD_S 10000
/*defautlt number of states in the simple word subalphabet*/
#define DEF_NBSTATE_TREE 10000
/*default number of states in the tree*/
#define AVERAGE_WORD_SIZE 5
/*average size of the string sequences*/ typedef struct {
v  ALP_T_D13 alp0;
   ALP4 alp1;
   ET_T_L44 *etats;
   unsigned long nb_etat;
} *TRANS_BSTAR_L44;
#define TAILLE_TRANSBSTAR_L44 (sizeof(ALP_T_D13)*2+sizeof(ET_T_L44 *)+sizeof(long))
define T_TRANS_BSTAR_L44 187 extern unsigned long newmax;
extern char trace;

typedef union {
   unsigned long l;
   struct {
      unsigned short g;
      unsigned short d;
   } s;
```

*17:09 Jun 16 1994*

(Determinizer)

```
} LBLOC;

unsigned long concat(unsigned long w1,unsigned long w2,ALP4 alp,unsigned long epsi_w,unsigned long ep
unsigned long longest_cp(unsigned long w1,unsigned long w2,ALP4 alp);
void insert_list(unsigned long *yy,unsigned long y);
unsigned long convert_pair(unsigned long n1,unsigned long n2);
unsigned long inva_b(unsigned long w1,unsigned long w2,ALP4 alp,unsigned long epsi_w);

TRANS_BSTAR_L44 trans_ST_L44(TRANS_L44 trans,
                             unsigned long epsi,
                             unsigned long interog2,
                             unsigned long dollar){
  ENS_ENS_INT ens;
  unsigned long max_et,*yy,epsi_w,*yy1,*yy2,*yyb;
  ALP4 alp;
  unsigned long n,q,qq,w,qq2,e,let,lcp,w2,interog_arr;
  CELLT44 l,l2;
  TRANS_BSTAR_L44 transs,trans2;
  LBLOC lb;
  int trv;
  char buff_trace[10000];

yyb=(unsigned long *)malloc(sizeof(long) * 10000);

transs=transl44_transbstarl44(trans);
  alp=transs->alp1;

*yyb=epsi;
  *yyb=LONG_OUT;
  epsi_w=ordaj_alp4_simple(alp,yyb);

if (newmax==LONG_OUT)
     max_et=100000;
  else
     max_et=newmax;

trans2=init_transbstarl44(max_et);
  ens=init_eei(max_et);

q=0;
  n=1;
  if (trace)
     fprintf(stderr,"q n / qq1 w1 / qq2 w2 ..\n");

*yyb=convert_pair(0,epsi_w);
  yyb[1]=FIN_LONG;
  in_add_eei(ens,yyb);
  do{
     /*trace*/   '
     if (trace){
        fprintf(stderr,"%ld %ld | ",q,n);
        for(yy=elt_eei(ens,q);*yy!=FIN_LONG;yy++){
```

(Determinizer)

```
      lb.l=*yy;
      qq=lb.s.g;w=lb.s.d;
      nb_alp4_ch((unsigned char *)buff_trace,w,alp);
      fprintf(stderr,"%ld %s | ",qq,buff_trace);
    }
    fprintf(stderr,"\n");
  }
  if (q==1174)
    fprintf(stderr,"Here 1174\n");

/*test if the state is terminal and if yes if any emission remains*/
  trv=NON;
  for(yy=elt_eei(ens,q);*yy!=FIN_LONG && trv==NON;yy++){
    lb.l=*yy;
    qq=lb.s.g;
    if (transs->etats[qq]->sorte!=NON_TERMINAL){
      trv=OUI;
      trans2->etats[q]->sorte=TERMINAL;

/*one checks that no emission remains at this point*/
      for(yy2=elt_eei(ens,q);*yy2!=FIN_LONG;yy2++){
        lb.l=*yy2;
        qq=lb.s.g;w=lb.s.d;
        if(w!=epsi_w){
          fprintf(stderr,"Warning trans_ST_L44 _manip33 0\n");
          fprintf(stderr,"The input transducer doesn't represent a sequential function, in fact\n");
          fprintf(stderr,"the state %ld that stands for:\n",q);
          for(yy=elt_eei(ens,q);*yy!=FIN_LONG;yy++)
            fprintf(stderr," %ld",*yy);
          fprintf(stderr,"\nstill has to emit %ld from %ld\n",w,qq);
        }
      }
    }
  } for(yy=elt_eei(ens,q);*yy!=FIN_LONG;yy++){
    lb.l=*yy;
    qq=lb.s.g;w=lb.s.d;

for(l=trans->etats[qq]->liste;l;l=l->suivant){
      let=l->cel_g1;

/*one first verifies that the letter has not yet been treated*/
      for(l2=trans2->etats[q]->liste;l2 && l2->cel_g1!=let;)
        l2=l2->suivant;
      if (!l2){

/*one first computes the longest common prefix of all the w.l->cel_g2*/
        lcp=concat(w,l->cel_g2,alp,epsi,epsi_w);
        for(l2=l->suivant;l2;l2=l2->suivant){
          if (l2->cel_g1==let){
            lcp=longest_cp(lcp,concat(w,l2->cel_g2,alp,epsi,epsi_w),alp);
          }
```

(Determiniser)

```
}
for(yy1=&(yy[1]);*yy1!=FIN_LONG;yy1++){
  lb.l=*yy1;
  qq2=lb.s.g;w2=lb.s.d;
  if (interog2==LONG_OUT){  /********* without  ??? *************/
    for(l2=trans->etats[qq2]->liste;l2;l2=l2->suivant){
      if (l2->cel_g1==let)
        lcp=longest_cp(lcp,concat(w2,l2->cel_g2,alp,epsi,epsi_w),alp);
    }
  }
  else{                      /********* with     ??? *************/
    trv=NON;
    interog_arr=LONG_OUT;
    for(l2=trans->etats[qq2]->liste;l2;l2=l2->suivant){
      if (l2->cel_g1==let){
        trv=OUI;
        lcp=longest_cp(lcp,concat(w2,l2->cel_g2,alp,epsi,epsi_w),alp);
      }
      else if (l2->cel_g1==interog2)
        interog_arr=l2->cel_d;
    }
    if (trv==NON && interog_arr!=LONG_OUT && let!=dollar){
      for(l2=trans->etats[qq2]->liste;l2;l2=l2->suivant){
        if (l2->cel_g1==interog2){
          if (l2->cel_g2!=interog2)
            lcp=longest_cp(lcp,concat(w2,l2->cel_g2,alp,epsi,epsi_w),alp);
          else
            lcp=longest_cp(lcp,concat(w2,let,alp,epsi,epsi_w),alp);
        }
      }
    }
  }
}

/*lcp is now computed, one now builds the arrival states*/
yy2=yyb;
*yy2=convert_pair(l->cel_d,inva_b(lcp,concat(w,l->cel_g2,alp,epsi,epsi_w),alp,epsi_w));
yy2[1]=FIN_LONG;
for(l2=l->suivant;l2;l2=l2->suivant){
  if (l2->cel_g1==let){
    if (n==227)
      fprintf(stderr,"Here\n");
    insert_list(yy2,convert_pair(l2->cel_d,inva_b(lcp,
                                 concat(w,l2->cel_g2,alp,epsi,epsi_w),
                                 alp,
                                 epsi_w)));
  }
}
for(yy1=&(yy[1]);*yy1!=FIN_LONG;yy1++){
  lb.l=*yy1;
  qq2=lb.s.g;w2=lb.s.d;
  if (interog2==LONG_OUT){  /*********** without ??? ***************/
    for(l2=trans->etats[qq2]->liste;l2;l2=l2->suivant){
```

(Determinizer)

```
            if (l2->cel_g1==let){
                insert_list(yy2,convert_pair(l2->cel_d,inva_b(lcp,
                                                              concat(w2,l2->cel_g2,alp,epsi,epsi_w),
                                                              alp,
                                                              epsi_w)));
            }
        }
    }
    else{           /********** with ???      ***************/              220
        trv=NON;
        interog_arr=LONG_OUT;
        for(l2=trans->etats[qq2]->liste;l2;l2=l2->suivant){
            if (l2->cel_g1==let){
                trv=OUI;
                insert_list(yy2,convert_pair(l2->cel_d,inva_b(lcp,
                                                              concat(w2,l2->cel_g2,alp,epsi,epsi_w),
                                                              alp,
                                                              epsi_w)));              230
            }
            else if (l2->cel_g1==interog2)
                interog_arr=l->cel_d;
        }
        if (trv==NON && interog_arr!=LONG_OUT && let!=dollar){
            for(l2=trans->etats[qq2]->liste;l2;l2=l2->suivant){
                if (l2->cel_g1==interog2){
                    if (l2->cel_g2!=interog2)
                        insert_list(yy2,convert_pair(l2->cel_d,inva_b(lcp,
                                                                      concat(w2,l2->cel_g2,alp,epsi,epsi_w),
                                                                      alp,
                                                                      epsi_w)));
                    else
                        insert_list(yy2,convert_pair(l2->cel_d,inva_b(lcp,
                                                                      concat(w2,let,alp,epsi,epsi_w),
                                                                      alp,
                                                                      epsi_w)));
                }
            }
        }                                                                              250
    }
}

/*yy2 now describes the arrival state, one has to verify it already exists or not*/
e=in_add_eei(ens,yy2);
n=ens->nb_elt;

if (n>=max_et-1){
    fprintf(stderr,"error 0 trans_ST_144: two many states, the maximum is %ld\n",max_et);
    exit(0);                                                                            260
}

/*one builds the transition*/
add_tr_bstarl44(trans2,q,let,lcp,e,NULL);
}
```

(Determinizer)

```
      }
    } q++;
  }while(q<n);

trans2->nb_etat=n;
  trans2->alp1=alp;
  trans2->alp0=transs->alp0;

free(yyb);

return trans2;
} unsigned long concat(unsigned long w1,
                     unsigned long w2,
                     ALP4 alp,
                     unsigned long epsi,
                     unsigned long epsi_w){
/*computes w1.w2 where w1 is a pointer to a sequence of strings of alp and w2 is a single word*/
  unsigned long w,tr1[5000],*tr2;

tr2=tr1;
  if (w1!=epsi_w){
    nb_alp4_ch_simple(tr1,w1,alp);
    for(tr2=tr1;*tr2!=LONG_OUT;)
      tr2++;
  }
  if (w2!=epsi)
    *tr2++=w2;
  if (w1!=epsi_w || w2!=epsi){
    *tr2=LONG_OUT;
    w=ordaj_alp4_simple(alp,tr1);
  }
  else
    w=epsi_w;

return w;
} unsigned long longest_cp(unsigned long w1,unsigned long w2,ALP4 alp){
/*computes the longest common prefixe between the two words w1 and w2 of alp*/
  unsigned long w,tr1[5000],tr2[5000],tr[5000],*ligne,*lg1,*lg2;

nb_alp4_ch_simple(tr1,w1,alp);
  nb_alp4_ch_simple(tr2,w2,alp);

lg1=tr1;
  lg2=tr2;
  ligne=tr;
  while(*lg1==*lg2){
    *ligne++=*lg1++;
```

(Determinizer)

```
    lg2++;
  }
  *ligne=LONG_OUT;

w=ordaj_alp4_simple(alp,tr);

return w;
} unsigned long convert_pair(unsigned long n1,unsigned long n2){
  unsigned long n;
  LBLOC b;

b.s.g=(unsigned short)n1;
  b.s.d=(unsigned short)n2;

n=b.l;

return n;
} unsigned long inva_b(unsigned long w1,unsigned long w2,ALP4 alp,unsigned long epsi_w){
  /*computes w1(-1).w2*/
  unsigned long tr1[5000],tr2[5000],*lg1,*lg2;
  unsigned long w;

nb_alp4_ch_simple(tr1,w1,alp);
  nb_alp4_ch_simple(tr2,w2,alp);

lg1=tr1;
  lg2=tr2;
  while(*lg1!=LONG_OUT && *lg1==*lg2){
    lg1++;
    lg2++;
  } if (*lg2!=LONG_OUT)
    w=ordaj_alp4_simple(alp,lg2);
  else
    w=epsi_w;

return w;
} void insert_list(unsigned long *yy,unsigned long y){
  unsigned long *tr,z,z2;

tr=yy;
  while(*tr!=FIN_LONG && *tr<y)
    tr++;

if (*tr!=y){
    z=y;
```

(Determinizer)

```
    while(*tr!=FIN_LONG){
      z2=*tr;
      *tr=z;
      z=z2;
      tr++;
    }
    *tr++=z;
    *tr=FIN_LONG;
  }
} void main(int nb,char **arg){
  unsigned long i,epsi,interog2,dollar;
  unsigned char c,epsilon[100],interog_ch[100];
  TRANS_L44 trans;
  TRANS_BSTAR_L44 trans2;

*epsilon='\0';
  *interog_ch='\0';
  for(i=1;i<=(nb-1);i++){
    else if (strcmp(arg[i],"-epsi")==0)
      strcpy((char *)epsilon,arg[i+1]);
    else if (strcmp(arg[i],"-interog2")==0)
      strcpy((char *)interog_ch,arg[i+1]);
    else if (strcmp(arg[i],"-trace")==0)
      trace=1;
  } c=fgetc(stdin);

if (c==T_TRANS_L44){
    trans=read_transl44(stdin);

if (*epsilon!='\0')
      epsi=ordaj_alptd13(trans->alp2,epsilon);
    else
      epsi=ordaj_alptd13(trans->alp2,"<E>");

if (*interog_ch!='\0')
      interog2=ord_alptd13(interog_ch,trans->alp2);
    else
      interog2=ord_alptd13("???",trans->alp2);

dollar=ord_alptd13("$",trans->alp2);

/*MAIN FUNCTION*/
    trans2=trans_ST_L44(trans,epsi,interog2,dollar);

fec(T_TRANS_BSTAR_L44,stdout);
    write_transbstarl44(stdout,trans2);
  }
```

380

390

400

410

420

17:09 Jun 16 1994    Page 8 of Determinizer (Determinizer)

```
    else{
        fprintf(stderr,"The input transducer should be of type TRANS_L44\n");
        exit(0);
    }
}
```

(Tagger)

```
/*------------------------------------------------

Tagger

Takes a sequential transducer a dictionary (in tagger)
    and tags the text.

The function and structure definitions in common with LocalExtension
    or Determinizer are not re-defined here. They can be found in
    LocalExtension and Determinizer.

The program should be called in the following way:

Taggertag tagger <text where tagger is the tagger and text an ASCII file containing text.

------------------------------------------------*/ define MAX_RULE 1000
define MAX_SIZE 10000 define HASPREF 0
define FHASPREF 1
#define HASSUF 2
#define FHASSUF 3
#define GOODRIGHT 4
#define FGOODRIGHT 5
#define GOODLEFT 6
#define FGOODLEFT 7
#define CHAR 8
#define FCHAR 9
#define ADDSUF 10
#define FADDSUF 11
#define DELETESUF 12
#define FDELETESUF 13
#define ADDPREF 14
#define FADDPREF 15
#define DELETEPREF 16
define FDELETEPREF 17 define COMPLETE_TAGGING 1
define DICTIONARY_TAGGING 2
define DICO_LEX_TAGGING 3 typedef struct {
    unsigned long nb_etat;
    unsigned short *bloc_g1;
    unsigned long *bloc_g2;
    unsigned short *bloc_d;
    unsigned long bloc_size;
```

17:31 Jun 16 1994

(Tagger)

```
      AUT_D13 alp_aut;
      unsigned char *output;
      unsigned long output_size;
      unsigned char output_interog2;
      unsigned char output_sep;
      unsigned short input_interog2;
   } *SEQU_BSTAR_D242;
   #define TAILLE_SEQU_BSTAR_D242 (sizeof(short *)*2+sizeof(long *)+3*sizeof(long)+sizeof(AUT_D13)+size
   #define T_SEQU_BSTAR_D242 193 typedef struct str_dicolex{
      unsigned long nb_tags;
      unsigned long num_to_tag_size;
      unsigned char **num_to_tag;
      AUT_D13 dico;
   }*DICO_LEX;
   #define TAILLE_DICOLEX (sizeof(struct str_dicolex))

typedef struct str_lexrule{
      unsigned char *tab_type;
      unsigned long nb_rules;
      unsigned long arg1_size;
      unsigned char **arg1;
      unsigned char *type_of_rule;
      unsigned long ftag_size;
      unsigned char **ftag;
      unsigned long tag_to_put_size;
      unsigned char **tag_to_put;
      unsigned char *the_tab_char;
      AUT_D13 goodleft_dico;
      AUT_D13 goodright_dico;
      AUT_D13 pref_dico;
      AUT_D13 suf_dico;
   } *LEXRULE;
   #define TAILLE_LEXRULE (sizeof(struct str_lexrule))

typedef struct str_tagger{
      DICO_LEX dic;
      LEXRULE lr;
      SEQU_BSTAR_D242 trans;
   }*TAGGER;
   #define TAILLE_TAGGER (sizeof(struct str_tagger))
   #define T_TAGGER 187 void tag_word_in_sentence(unsigned char **tags,
                             unsigned char **words,
                             LEXRULE lr,
                             DICO_LEX dico,
                             int tp,
                             unsigned char *defaultTag);

void tag_unknown_word(unsigned char *tag,
```

(Tagger)

```
                    unsigned char *word,
                    unsigned char *prevword,
                    unsigned char *nextword,
                    LEXRULE lr,
                    AUT_D13 dico);

LEXRULE compile_lexrule(FILE *f,
                    AUT_D13 goodleft_dico,
                    AUT_D13 goodright_dico,
                    AUT_D13 pref_dico,
                    AUT_D13 suf_dico);

LEXRULE read_lexrule(FILE *f);
void write_lexrule(FILE *f,LEXRULE lr);
void aff_lexrule(FILE *f,LEXRULE lr);
void write_dico_lex(FILE *f,DICO_LEX dico);
DICO_LEX read_dicolex(FILE *f);
void write_tagger(FILE *f,TAGGER tagger);
TAGGER read_tagger(FILE *f);

void extrac_dicos(FILE *goodleft,
                    FILE *goodright,
                    FILE *pref,
                    FILE *suf,
                    FILE *f);

int has_pref_in(unsigned char *word,AUT_D13 dico);
int has_suf_in(unsigned char *word,AUT_D13 dico);
int is_pref_of(unsigned char *word,AUT_D13 dico);
int has_char(unsigned char *word,unsigned char *tab);

void tag_file(FILE *out,FILE *f,TAGGER tagger,int tp,unsigned char *defaultTag);
void tag_file_buff(FILE *out,
                    FILE *f,
                    TAGGER tagger,
                    int tp,
                    unsigned char *defaultTag,
                    unsigned char *buff,
                    unsigned char **words,
                    unsigned char **tags,
                    unsigned char **tags_tmp,
                    unsigned char **stack);

void write_tagged_sentence(FILE *f,
                    unsigned char **words,
                    unsigned char **tags);

void spread_sentence(unsigned char **words,
                    unsigned char **tags,
                    unsigned char **tags2,
                    unsigned char *buff);

void tag_sentence(unsigned char **tags,
```

```
                    unsigned char **words,
                    TAGGER tagger,
                    int tp,
                    unsigned char *defaultTag,
                    unsigned char **tags_buff,
                    unsigned char **stack);

void tag_file(FILE *out,
              FILE *f,
              TAGGER tagger,
              int tp,
              unsigned char *defaultTag){
  unsigned char *buff;
  unsigned char **words,**tags,**tags_tmp,**stack;
  unsigned long i;

buff=(unsigned char *)malloc(sizeof(char)*10000);
  words=(unsigned char **)malloc(sizeof(char *)*1000);
  for(i=0;i<=999;i++)
     words[i]=(unsigned char *)malloc(sizeof(char)*100);

tags=(unsigned char **)malloc(sizeof(char)*1000);
  for(i=0;i<=999;i++)
     tags[i]=(unsigned char *)malloc(sizeof(char)*20);

tags_tmp=(unsigned char **)malloc(sizeof(char)*1000);
  for(i=0;i<=999;i++)
     tags_tmp[i]=(unsigned char *)malloc(sizeof(char)*20);

stack=(unsigned char **)malloc(sizeof(char *)*10);
  for(i=0;i<=9;i++)
     stack[i]=(unsigned char *)malloc(sizeof(char)*100);

tag_file_buff(out,f,tagger,tp,defaultTag,buff,words,tags,tags_tmp,stack);
} void tag_file_buff(FILE *out,
                   FILE *f,
                   TAGGER tagger,
                   int tp,
                   unsigned char *defaultTag,
                   unsigned char *buff,
                   unsigned char **words,
                   unsigned char **tags,
                   unsigned char **tags_tmp,
                   unsigned char **stack){ strcpy((char *)words[0],"STAART");
  strcpy((char *)tags_tmp[0],"STAART");
  strcpy((char *)tags[0],"STAART");
```

(Tagger)

```
        while(fgets((char *)buff,9999,f)){
            if (*buff!='\0' && *buff!='\n'){ spread_sentence(&(words[1]),
                                &(tags_tmp[1]),
                                &(tags[1]),
                                buff);

tag_sentence(tags,
                             words,
                             tagger,
                             tp,
                             defaultTag,
                             tags_tmp,
                             stack);

write_tagged_sentence(out,words,tags);
            }
        }
    } void spread_sentence(unsigned char **words,
                         unsigned char **tags,
                         unsigned char **tags2,
                         unsigned char *buff){
        unsigned char *ligne,*lg2;
        unsigned long nb_word;

nb_word=0;
        ligne=buff;
        while(*ligne!='\0' && *ligne!='\n'){
            lg2=words[nb_word];
            while(*ligne!=' ' && *ligne!='\0' && *ligne!='\n')
                *lg2++=*ligne++;
            *lg2='\0';
            while(*ligne==' ')
                ligne++;
            nb_word++;
        }
        strcpy((char *)words[nb_word],"$");
        strcpy((char *)tags[nb_word],"$");
        strcpy((char *)tags2[nb_word++],"$");
        words[nb_word][0]='\0';
        tags[nb_word][0]='\0';
        tags2[nb_word][0]='\0';
    } void write_tagged_sentence(FILE *f,
                               unsigned char **words,
                               unsigned char **tags){
        unsigned long i;
```

*17:31 Jun 16 1994*

(Tagger)

```
      i=1;
      while(words[i+1][0]!='\0'){
        fprintf(f,"%s/%s ",words[i],tags[i]);
        i++;
      }
      fprintf(f,"\n");
    } void tag_sentence(unsigned char **tags,
                      unsigned char **words,
                      TAGGER tagger,
                      int tp,
                      unsigned char *defaultTag,
                      unsigned char **tags_buff,
                      unsigned char **stack){ if (tp==COMPLETE_TAGGING){
        tag_word_in_sentence(tags_buff,
                      words,
                      tagger->lr,
                      tagger->dic,
                      tp,
                      defaultTag);

fsequ_bstar_d242_tab(tags,
                      tags_buff,
                      tagger->trans,
                      '/',
                      stack);
      }
      else{
        tag_word_in_sentence(tags,
                      words,
                      tagger->lr,
                      tagger->dic,
                      tp,
                      defaultTag);
      }

} void tag_word_in_sentence(unsigned char **tags,
                      unsigned char **words,
                      LEXRULE lr,
                      DICO_LEX dico,
                      int tp,
                      unsigned char *defaultTag){
      unsigned char *curword,**num_to_tag,w2[10];
      unsigned long num,i;
      AUT_D13 aut;

*w2='\0';
```

(Tagger)

```
    num_to_tag=dico->num_to_tag;
    aut=dico->dico;

for(i=1;words[i+1][0]!='\0';i++){
      curword=words[i];
      if ((num=in_autd13(curword,aut))!=LONG_OUT){
        strcpy((char *)tags[i],(char *)num_to_tag[num-1]);
      }
      else if (tp!=DICTIONARY_TAGGING){
        strcpy((char *)tags[i],(char *)defaultTag);

tag_unknown_word(tags[i],
                         curword,
                         words[i-1],
                         words[i+1],
                         lr,
                         aut);
      }
      else{
        strcpy((char *)tags[i],(char *)defaultTag);
      }
    }
} void tag_unknown_word(unsigned char *tag,
                      unsigned char *word,
                      unsigned char *prevword,
                      unsigned char *nextword,
                      LEXRULE lr,
                      AUT_D13 dico){
  unsigned long num,i;
  int trv,the_type;
  unsigned char *ligne,*lg2,w2[100];
  unsigned long nb_rules;
  unsigned char **arg1,*type_of_rule,**ftag,**tag_to_put,*curtag,c,*tab_type;

tab_type=lr->tab_type;
  nb_rules=lr->nb_rules;
  arg1=lr->arg1;
  type_of_rule=lr->type_of_rule;
  ftag=lr->ftag;
  tag_to_put=lr->tag_to_put;

curtag=tag;

if ((num=in_autd13(nextword,lr->goodright_dico))!=LONG_OUT){
    tab_type[GOODRIGHT]=1;
    tab_type[FGOODRIGHT]=1;
  }
  if ((num=in_autd13(prevword,lr->goodleft_dico))!=LONG_OUT){
    tab_type[GOODLEFT]=1;
    tab_type[FGOODLEFT]=1;
```

(Tagger)

```
        }
        if (has_pref_in(word,lr->pref_dico)){
          tab_type[HASPREF]=1;
          tab_type[FHASPREF]=1;
          tab_type[DELETEPREF]=1;
          tab_type[FDELETEPREF]=1;
        }
        if (has_suf_in(word,lr->suf_dico)){
          tab_type[HASSUF]=1;
          tab_type[FHASSUF]=1;
          tab_type[DELETESUF]=1;
          tab_type[FDELETESUF]=1;
        }
        if (is_pref_of(word,dico)){
          tab_type[ADDSUF]=1;
          tab_type[FADDSUF]=1;
        }
        if (has_char(word,lr->the_tab_char)){
          tab_type[CHAR]=1;
          tab_type[FCHAR]=1;
        }
        tab_type[ADDPREF]=1;
        tab_type[FADDPREF]=1;

for(i=0;i<=(nb_rules-1);i++){
          if (tab_type[type_of_rule[i]]){
            the_type=type_of_rule[i];
            trv=OUI;
            if (the_type % 2){
              trv=NON;
              if (strcmp((char *)ftag[i],(char *)curtag))
                trv=OUI;
            }
            if (trv==OUI){
              switch (the_type /2) {
              case (HASPREF/2):
                ligne=arg1[i];
                lg2=word;
                while(*lg2!='\0' && *ligne==*lg2){
                  lg2++;
                  ligne++;
                }
                if (*ligne=='\0')
                  strcpy((char *)curtag,(char *)tag_to_put[i]);
                break;
              case (HASSUF/2):
                ligne=arg1[i];
                lg2=&(word[strlen((char *)word)-1]);
                while(lg2>=word && *lg2==*ligne){
                  lg2--;
                  ligne++;
                }
                if (*ligne=='\0')
```

(Tagger)

```
      strcpy((char *)curtag,(char *)tag_to_put[i]);
   break;
   case(DELETESUF/2):
   ligne=arg1[i];
   strcpy((char *)w2,(char *)word);
   lg2=&(w2[strlen((char *)word)-1]);
   while(lg2!=w2 && *lg2==*ligne){
      ligne++;
      lg2--;
   }
   if (*ligne=='\0'){
      *lg2='\0';
      if (in_autd13(w2,dico)!=LONG_OUT)
         strcpy((char *)curtag,(char *)tag_to_put[i]);
   }
   break;
case (DELETEPREF/2):
   ligne=arg1[i];
   lg2=word;
   while(*ligne!='\0' && *ligne==*lg2){
      ligne++;
      lg2++;
   }
   if (*ligne=='\0'){
      if (in_autd13(lg2,dico)!=LONG_OUT)
         strcpy((char *)curtag,(char *)tag_to_put[i]);
   }
   break;
case (ADDPREF/2):
   strcpy((char *)w2,(char *)arg1[i]);
   strcat((char *)w2,(char *)word);
   if (in_auttd13(w2,dico)!=LONG_OUT)
      strcpy((char *)curtag,(char *)tag_to_put[i]);
   break;
case (ADDSUF/2):
   strcpy((char *)w2,(char *)word);
   strcat((char *)w2,(char *)arg1[i]);
   if (in_auttd13(w2,dico)!=LONG_OUT)
      strcpy((char *)curtag,(char *)tag_to_put[i]);
   break;
case (GOODRIGHT/2):
   if (!strcmp((char *)arg1[i],(char *)nextword))
      strcpy((char *)curtag,(char *)tag_to_put[i]);
   break;
case (GOODLEFT/2):
   if (!strcmp((char *)arg1[i],(char *)prevword))
      strcpy((char *)curtag,(char *)tag_to_put[i]);
   break;
case (CHAR/2):
   trv=0;
   c=*arg1[i];
   for(ligne=word;*ligne!='\0';ligne++){
      if (*ligne==c)
```

(Tagger)

```
            trv=1;
         }
         if (trv)
            strcpy((char *)curtag,(char *)tag_to_put[i]);     480
         break;
       }
      }
     }
    }
} tab_type[GOODRIGHT]=1;
   tab_type[FGOODRIGHT]=1;                                    490
   tab_type[GOODLEFT]=1;
   tab_type[FGOODLEFT]=1;
   tab_type[HASPREF]=1;
   tab_type[FHASPREF]=1;
   tab_type[DELETEPREF]=1;
   tab_type[FDELETEPREF]=1;
   tab_type[HASSUF]=1;
   tab_type[FHASSUF]=1;
   tab_type[DELETESUF]=1;
   tab_type[FDELETESUF]=1;                                    500
   tab_type[ADDSUF]=1;
   tab_type[FADDSUF]=1;
   tab_type[CHAR]=1;
   tab_type[FCHAR]=1;
   tab_type[ADDPREF]=1;
   tab_type[FADDPREF]=1;

}

LEXRULE compile_lexrule(FILE *f,                              510
                    AUT_D13 goodleft_dico,
                    AUT_D13 goodright_dico,
                    AUT_D13 pref_dico,
                    AUT_D13 suf_dico){
   LEXRULE lr;
   unsigned char buff[4000],*ligne,*lg2;
   unsigned char arg[10][100],*tr_arg1,*tr_tag_to_put,*tr_ftag;
   unsigned long arg1_size,nb_rules,tag_to_put_size,ftag_size,k;

lr=(LEXRULE)malloc(TAILLE_LEXRULE);                        520 lr->arg1=(unsigned char **)malloc(sizeof(char *)*MAX_RULE);
   tr_arg1=lr->arg1[0]=(unsigned char *)malloc(sizeof(char)*MAX_SIZE);
   arg1_size=0;

lr->tag_to_put=(unsigned char **)malloc(sizeof(char *)*MAX_RULE);
   tr_tag_to_put=lr->tag_to_put[0]=(unsigned char *)malloc(sizeof(char)*MAX_SIZE);
   tag_to_put_size=0;

lr->ftag=(unsigned char **)malloc(sizeof(char *)*MAX_RULE);    530
```

(Tagger)

```
tr_ftag=lr->ftag[0]=(unsigned char *)malloc(sizeof(char)*MAX_SIZE);
ftag_size=0;

lr->type_of_rule=(unsigned char *)malloc(sizeof(char *)*MAX_RULE);

lr->the_tab_char=(unsigned char *)calloc(sizeof(char),256);

nb_rules=0;
while(fgets((char *)buff,2048,f)){
    if (*buff!='\0' && *buff!='\n'){                                              540
        k=0;
        for(ligne=buff;*ligne!='\0' && *ligne!='\n';){
            for(lg2=arg[k];*ligne!=' ' && *ligne!='\0' && *ligne!='\n';){
                *lg2++=*ligne++;
            }
            k++;
            *lg2='\0';
            while(*ligne==' ')
                ligne++;
        }                                                                         550 if (!strcmp((char *)arg[1],"haspref")){
            lr->type_of_rule[nb_rules]=HASPREF;

lr->arg1[nb_rules]=tr_arg1;
            for(ligne=arg[0];*ligne!='\0' && *ligne!='\n';){
                *tr_arg1++=*ligne++;
                arg1_size++;
            }
            *tr_arg1++='\0';arg1_size++;                                          560 lr->tag_to_put[nb_rules]=tr_tag_to_put;
            for(ligne=arg[3];*ligne!='\0';){
                *tr_tag_to_put++=*ligne++;
                tag_to_put_size++;
            }
            *tr_tag_to_put++='\0';tag_to_put_size++;
        }
        else if (!strcmp((char *)arg[2],"fhaspref")){
            lr->type_of_rule[nb_rules]=FHASPREF;                                  570 lr->ftag[nb_rules]=tr_ftag;
            for(ligne=arg[0];*ligne!='\0';){
                *tr_ftag++=*ligne++;
                ftag_size++;
            }
            *tr_ftag++='\0';ftag_size++;

lr->arg1[nb_rules]=tr_arg1;
            for(ligne=arg[1];*ligne!='\0';){                                      580
                *tr_arg1++=*ligne++;
                arg1_size++;
            }
```

(Tagger)

```
    *tr_arg1++='\0';arg1_size++;

lr->tag_to_put[nb_rules]=tr_tag_to_put;
    for(ligne=arg[4];*ligne!='\0';){
       *tr_tag_to_put++=*ligne++;
       tag_to_put_size++;
    }
    *tr_tag_to_put++='\0';tag_to_put_size++;
}
else if (!strcmp((char *)arg[1],"hassuf")){
    lr->type_of_rule[nb_rules]=HASSUF;

lr->arg1[nb_rules]=tr_arg1;
    for(ligne=arg[0];*ligne!='\0';){
       *tr_arg1++=*ligne++;
       arg1_size++;
    }
    *tr_arg1++='\0';arg1_size++;

lr->tag_to_put[nb_rules]=tr_tag_to_put;
    for(ligne=arg[3];*ligne!='\0';){
       *tr_tag_to_put++=*ligne++;
       tag_to_put_size++;
    }
    *tr_tag_to_put++='\0';tag_to_put_size++;
}
else if (!strcmp((char *)arg[2],"fhassuf")){
    lr->type_of_rule[nb_rules]=FHASSUF;

lr->ftag[nb_rules]=tr_ftag;
    for(ligne=arg[0];*ligne!='\0';){
       *tr_ftag++=*ligne++;
       ftag_size++;
    }
    *tr_ftag++='\0';ftag_size++;

lr->arg1[nb_rules]=tr_arg1;
    for(ligne=arg[1];*ligne!='\0';){
       *tr_arg1++=*ligne++;
       arg1_size++;
    }
    *tr_arg1++='\0';arg1_size++;

lr->tag_to_put[nb_rules]=tr_tag_to_put;
    for(ligne=arg[4];*ligne!='\0';){
       *tr_tag_to_put++=*ligne++;
       tag_to_put_size++;
    }
    *tr_tag_to_put++='\0';tag_to_put_size++;
}
else if (!strcmp((char *)arg[1],"addsuf")){
    lr->type_of_rule[nb_rules]=ADDSUF;
```

(Tagger)

```
    lr->arg1[nb_rules]=tr_arg1;
    for(ligne=arg[0];*ligne!='\0';){
      *tr_arg1++=*ligne++;
      arg1_size++;
    }
    *tr_arg1++='\0';arg1_size++;                                              640 lr->tag_to_put[nb_rules]=tr_tag_to_put;
    for(ligne=arg[3];*ligne!='\0';){
      *tr_tag_to_put++=*ligne++;
      tag_to_put_size++;
    }
    *tr_tag_to_put++='\0';tag_to_put_size++;
  }                                                                           650
  else if (!strcmp((char *)arg[2],"faddsuf")){
    lr->type_of_rule[nb_rules]=FADDSUF;

lr->ftag[nb_rules]=tr_ftag;
    for(ligne=arg[0];*ligne!='\0';){
      *tr_ftag++=*ligne++;
      ftag_size++;
    }
    *tr_ftag++='\0';ftag_size++;
                                                                              660
    lr->arg1[nb_rules]=tr_arg1;
    for(ligne=arg[1];*ligne!='\0';){
      *tr_arg1++=*ligne++;
      arg1_size++;
    }
    *tr_arg1++='\0';arg1_size++;

lr->tag_to_put[nb_rules]=tr_tag_to_put;
    for(ligne=arg[4];*ligne!='\0';){
      *tr_tag_to_put++=*ligne++;
      tag_to_put_size++;                                                      670
    }
    *tr_tag_to_put++='\0';tag_to_put_size++;
  }
  else if (!strcmp((char *)arg[1],"addpref")){
    lr->type_of_rule[nb_rules]=ADDPREF;

lr->arg1[nb_rules]=tr_arg1;
    for(ligne=arg[0];*ligne!='\0';){
      *tr_arg1++=*ligne++;
      arg1_size++;                                                            680
    }
    *tr_arg1++='\0';arg1_size++;

lr->tag_to_put[nb_rules]=tr_tag_to_put;
    for(ligne=arg[3];*ligne!='\0';){
      *tr_tag_to_put++=*ligne++;
      tag_to_put_size++;
    }
```

(Tagger)

```
      *tr_tag_to_put++='\0';tag_to_put_size++;
    }
    else if (!strcmp((char *)arg[2],"faddpref")){
      lr->type_of_rule[nb_rules]=FADDPREF;

lr->ftag[nb_rules]=tr_ftag;
      for(ligne=arg[0];*ligne!='\0';){
        *tr_ftag++=*ligne++;
        ftag_size++;
      }
      *tr_ftag++='\0';ftag_size++;

lr->arg1[nb_rules]=tr_arg1;
      for(ligne=arg[1];*ligne!='\0';){
        *tr_arg1++=*ligne++;
        arg1_size++;
      }
      *tr_arg1++='\0';arg1_size++;

lr->tag_to_put[nb_rules]=tr_tag_to_put;
      for(ligne=arg[4];*ligne!='\0';){
        *tr_tag_to_put++=*ligne++;
        tag_to_put_size++;
      }
      *tr_tag_to_put++='\0';tag_to_put_size++;
    }
    else if (!strcmp((char *)arg[1],"deletepref")){
      lr->type_of_rule[nb_rules]=DELETEPREF;

lr->arg1[nb_rules]=tr_arg1;
      for(ligne=arg[0];*ligne!='\0';){
        *tr_arg1++=*ligne++;
        arg1_size++;
      }
      *tr_arg1++='\0';arg1_size++;

lr->tag_to_put[nb_rules]=tr_tag_to_put;
      for(ligne=arg[3];*ligne!='\0';){
        *tr_tag_to_put++=*ligne++;
        tag_to_put_size++;
      }
      *tr_tag_to_put++='\0';tag_to_put_size++;
    }
    else if (!strcmp((char *)arg[2],"fdeletepref")){
      lr->type_of_rule[nb_rules]=FDELETEPREF;

lr->ftag[nb_rules]=tr_ftag;
      for(ligne=arg[0];*ligne!='\0';){
        *tr_ftag++=*ligne++;
        ftag_size++;
      }
      *tr_ftag++='\0';ftag_size++;
```

(Tagger)

```
    lr->arg1[nb_rules]=tr_arg1;
    for(ligne=arg[1];*ligne!='\0';){
       *tr_arg1++=*ligne++;
       arg1_size++;
    }
    *tr_arg1++='\0';arg1_size++;

lr->tag_to_put[nb_rules]=tr_tag_to_put;                        750
    for(ligne=arg[4];*ligne!='\0';){
       *tr_tag_to_put++=*ligne++;
       tag_to_put_size++;
    }
    *tr_tag_to_put++='\0';tag_to_put_size++;
}
else if (!strcmp((char *)arg[1],"deletesuf")){
    lr->type_of_rule[nb_rules]=DELETESUF;

lr->arg1[nb_rules]=tr_arg1;                                    760
    for(ligne=arg[0];*ligne!='\0';){
       *tr_arg1++=*ligne++;
       arg1_size++;
    }
    *tr_arg1++='\0';arg1_size++;

lr->tag_to_put[nb_rules]=tr_tag_to_put;
    for(ligne=arg[3];*ligne!='\0';){
       *tr_tag_to_put++=*ligne++;
       tag_to_put_size++;                                          770
    }
    *tr_tag_to_put++='\0';tag_to_put_size++;
}
else if (!strcmp((char *)arg[2],"fdeletesuf")){
    lr->type_of_rule[nb_rules]=FDELETESUF;

lr->ftag[nb_rules]=tr_ftag;
    for(ligne=arg[0];*ligne!='\0';){
       *tr_ftag++=*ligne++;
       ftag_size++;                                                780
    }
    *tr_ftag++='\0';ftag_size++;

lr->arg1[nb_rules]=tr_arg1;
    for(ligne=arg[1];*ligne!='\0';){
       *tr_arg1++=*ligne++;
       arg1_size++;
    }
    *tr_arg1++='\0';arg1_size++;
                                                                   790
    lr->tag_to_put[nb_rules]=tr_tag_to_put;
    for(ligne=arg[4];*ligne!='\0';){
       *tr_tag_to_put++=*ligne++;
       tag_to_put_size++;
    }
```

(Tagger)

```
      *tr_tag_to_put++='\0';tag_to_put_size++;
    }
    else if (!strcmp((char *)arg[1],"goodright")){
      lr->type_of_rule[nb_rules]=GOODRIGHT;

lr->arg1[nb_rules]=tr_arg1;                                          800
      for(ligne=arg[0];*ligne!='\0';){
        *tr_arg1++=*ligne++;
        arg1_size++;
      }
      *tr_arg1++='\0';arg1_size++;

lr->tag_to_put[nb_rules]=tr_tag_to_put;
      for(ligne=arg[2];*ligne!='\0';){
        *tr_tag_to_put++=*ligne++;                                         810
        tag_to_put_size++;
      }
      *tr_tag_to_put++='\0';tag_to_put_size++;
    }
    else if (!strcmp((char *)arg[2],"fgoodright")){
      lr->type_of_rule[nb_rules]=FGOODRIGHT;

lr->ftag[nb_rules]=tr_ftag;
      for(ligne=arg[0];*ligne!='\0';){
        *tr_ftag++=*ligne++;                                               820
        ftag_size++;
      }
      *tr_ftag++='\0';ftag_size++;

lr->arg1[nb_rules]=tr_arg1;
      for(ligne=arg[1];*ligne!='\0';){
        *tr_arg1++=*ligne++;
        arg1_size++;
      }
      *tr_arg1++='\0';arg1_size++;                                         830 lr->tag_to_put[nb_rules]=tr_tag_to_put;
      for(ligne=arg[3];*ligne!='\0';){
        *tr_tag_to_put++=*ligne++;
        tag_to_put_size++;
      }
      *tr_tag_to_put++='\0';tag_to_put_size++;
    }
    else if (!strcmp((char *)arg[1],"goodleft")){
      lr->type_of_rule[nb_rules]=GOODLEFT;                                 840 lr->arg1[nb_rules]=tr_arg1;
      for(ligne=arg[0];*ligne!='\0';){
        *tr_arg1++=*ligne++;
        arg1_size++;
      }
      *tr_arg1++='\0';arg1_size++;
```

(Tagger)

```
          lr->tag_to_put[nb_rules]=tr_tag_to_put;
          for(ligne=arg[2];*ligne!='\0';){
             *tr_tag_to_put++=*ligne++;
             tag_to_put_size++;
          }
          *tr_tag_to_put++='\0';tag_to_put_size++;
       }
       else if (!strcmp((char *)arg[2],"fgoodleft")){
          lr->type_of_rule[nb_rules]=FGOODLEFT;

lr->ftag[nb_rules]=tr_ftag;
          for(ligne=arg[0];*ligne!='\0';){
             *tr_ftag++=*ligne++;
             ftag_size++;
          }
          *tr_ftag++='\0';ftag_size++;

lr->arg1[nb_rules]=tr_arg1;
          for(ligne=arg[1];*ligne!='\0';){
             *tr_arg1++=*ligne++;
             arg1_size++;
          }
          *tr_arg1++='\0';arg1_size++;

lr->tag_to_put[nb_rules]=tr_tag_to_put;
          for(ligne=arg[3];*ligne!='\0';){
             *tr_tag_to_put++=*ligne++;
             tag_to_put_size++;
          }
          *tr_tag_to_put++='\0';tag_to_put_size++;
       }
       else if (!strcmp((char *)arg[1],"char")){
          lr->type_of_rule[nb_rules]=CHAR;

lr->arg1[nb_rules]=tr_arg1;
          for(ligne=arg[0];*ligne!='\0';){
             *tr_arg1++=*ligne++;
             arg1_size++;
          }
          *tr_arg1++='\0';arg1_size++;
          lr->the_tab_char[*arg[0]]=1;

lr->tag_to_put[nb_rules]=tr_tag_to_put;
          for(ligne=arg[2];*ligne!='\0';){
             *tr_tag_to_put++=*ligne++;
             tag_to_put_size++;
          }
          *tr_tag_to_put++='\0';tag_to_put_size++;
       }
       else if (!strcmp((char *)arg[2],"fchar")){
          lr->type_of_rule[nb_rules]=FCHAR;

lr->ftag[nb_rules]=tr_ftag;
```

(Tagger)

```
        for(ligne=arg[0];*ligne!='\0';){
          *tr_ftag++=*ligne++;
          ftag_size++;
        }
        *tr_ftag++='\0';ftag_size++;

lr->arg1[nb_rules]=tr_arg1;
        for(ligne=arg[1];*ligne!='\0';){
          *tr_arg1++=*ligne++;
          arg1_size++;
        }
        *tr_arg1++='\0';arg1_size++;
        lr->the_tab_char[*arg[1]]=1;

lr->tag_to_put[nb_rules]=tr_tag_to_put;
        for(ligne=arg[3];*ligne!='\0';){
          *tr_tag_to_put++=*ligne++;
          tag_to_put_size++;
        }
        *tr_tag_to_put++='\0';tag_to_put_size++;
      }
      else{
        fprintf(stderr,"The line %s cannot be treated.\n",buff);
        exit(0);
      }
      nb_rules++;
    }
  } lr->nb_rules=nb_rules;
  lr->arg1_size=arg1_size;
  lr->tag_to_put_size=tag_to_put_size;
  lr->ftag_size=ftag_size;

lr->goodleft_dico=goodleft_dico;
  lr->goodright_dico=goodright_dico;
  lr->pref_dico=pref_dico;
  lr->suf_dico=suf_dico;

return lr;
} void extrac_dicos(FILE *goodleft,
                  FILE *goodright,
                  FILE *pref,
                  FILE *suf,
                  FILE *f){
  unsigned char buff[2048],*ligne,*lg2;
  unsigned char arg[10][100],*tr_arg1,*tr_tag_to_put,*tr_ftag;
  unsigned long arg1_size,nb_rules,tag_to_put_size,ftag_size,k;

while(fgets((char *)buff,2048,f)){
    if (*buff!='\0' && *buff!='\n'){
```

```
    k=0;
    for(ligne=buff;*ligne!='\0' && *ligne!='\n';){
      for(lg2=arg[k];*ligne!=' ' && *ligne!='\0' && *ligne!='\n';){
        *lg2++=*ligne++;
      }
      k++;
      *lg2='\0';
      while(*ligne==' ')
        ligne++;
    } if (!strcmp((char *)arg[1],"haspref")){
      fprintf(pref,"%s\n",arg[0]);
    }
    else if (!strcmp((char *)arg[2],"fhaspref")){
      fprintf(pref,"%s\n",arg[1]);
    }
    else if (!strcmp((char *)arg[1],"hassuf")){
      fprintf(suf,"%s\n",arg[0]);
    }
    else if (!strcmp((char *)arg[2],"fhassuf")){
      fprintf(suf,"%s\n",arg[1]);
    }
    else if (!strcmp((char *)arg[1],"addsuf")){
    }
    else if (!strcmp((char *)arg[2],"faddsuf")){
    }
    else if (!strcmp((char *)arg[1],"addpref")){
    }
    else if (!strcmp((char *)arg[1],"faddpref")){
    }
    else if (!strcmp((char *)arg[1],"deletepref")){
      fprintf(pref,"%s\n",arg[0]);
    }
    else if (!strcmp((char *)arg[2],"fdeletepref")){
      fprintf(pref,"%s\n",arg[1]);
    }
    else if (!strcmp((char *)arg[1],"deletesuf")){
      fprintf(suf,"%s\n",arg[0]);
    }
    else if (!strcmp((char *)arg[2],"fdeletesuf")){
      fprintf(suf,"%s\n",arg[1]);
    }
    else if (!strcmp((char *)arg[1],"goodright")){
      fprintf(goodright,"%s\n",arg[0]);
    }
    else if (!strcmp((char *)arg[2],"fgoodright")){
      fprintf(goodright,"%s\n",arg[1]);
    }
    else if (!strcmp((char *)arg[1],"goodleft")){
      fprintf(goodleft,"%s\n",arg[0]);
    }
    else if (!strcmp((char *)arg[2],"fgoodleft")){
```

(Tagger)

```
        fprintf(goodleft,"%s\n",arg[1]);
      }
      else if (!strcmp((char *)arg[1],"char")){
      }
      else if (!strcmp((char *)arg[2],"fchar")){
      }
    }
  }
}

DICO_LEX read_dicolex(FILE *f){
  UBLOC ubl;
  DICO_LEX dd;
  unsigned char *ligne;
  unsigned long i;

dd=(DICO_LEX)malloc(TAILLE_DICOLEX);

#ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
  ubl.str[0]=fgetc(f);
endif
  dd->nb_tags=ubl.l;

#ifndef INV
  ubl.str[0]=fgetc(f);
  ubl.str[1]=fgetc(f);
  ubl.str[2]=fgetc(f);
  ubl.str[3]=fgetc(f);
#else
  ubl.str[3]=fgetc(f);
  ubl.str[2]=fgetc(f);
  ubl.str[1]=fgetc(f);
  ubl.str[0]=fgetc(f);
endif
  dd->num_to_tag_size=ubl.l;

dd->num_to_tag=(unsigned char **)malloc(sizeof(char *)*dd->nb_tags);
  ligne=dd->num_to_tag[0]=(unsigned char *)malloc(sizeof(char)*(dd->num_to_tag_size));
  fread(dd->num_to_tag[0],sizeof(char),dd->num_to_tag_size,f);
  for(i=0;i<=dd->nb_tags-1;i++){
    dd->num_to_tag[i]=ligne;
    while(*ligne!='\0')
      ligne++;
    ligne++;
  }
```

(Tagger)

```
      dd->dico=read_autd13(f);

return dd;
}
void write_dico_lex(FILE *f,DICO_LEX dico){
   UBLOC ubl;

ubl.l=dico->nb_tags;
#ifndef INV
   fec(ubl.str[0],f);
   fec(ubl.str[1],f);
   fec(ubl.str[2],f);
   fec(ubl.str[3],f);
#else
   fec(ubl.str[3],f);
   fec(ubl.str[2],f);
   fec(ubl.str[1],f);
   fec(ubl.str[0],f);
endif ubl.l=dico->num_to_tag_size;
ifndef INV
   fec(ubl.str[0],f);
   fec(ubl.str[1],f);
   fec(ubl.str[2],f);
   fec(ubl.str[3],f);
#else
   fec(ubl.str[3],f);
   fec(ubl.str[2],f);
   fec(ubl.str[1],f);
   fec(ubl.str[0],f);
endif fwrite(dico->num_to_tag[0],sizeof(char),dico->num_to_tag_size,f);

write_autd13(f,dico->dico);
}
LEXRULE read_lexrule(FILE *f){
   UBLOC ubl;
   LEXRULE lr;
   unsigned long nb_tags,nb_rules,i;
   unsigned char *ligne;

lr=(LEXRULE)malloc(TAILLE_LEXRULE);

lr->tab_type=(unsigned char *)calloc(sizeof(char),20);

#ifndef INV
   ubl.str[0]=fgetc(f);
```

(Tagger)

```
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif
    nb_rules=lr->nb_rules=ubl.l;

#ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif
    lr->arg1_size=ubl.l;

lr->arg1=(unsigned char **)malloc(sizeof(char *)*(nb_rules));
    ligne=lr->arg1[0]=(unsigned char *)malloc(sizeof(char)*(lr->arg1_size));
    fread(lr->arg1[0],sizeof(char),lr->arg1_size,f);
    for(i=0;i<=nb_rules-1;i++){
       lr->arg1[i]=ligne;
       while(*ligne!='\0')
         ligne++;
       ligne++;
    } lr->type_of_rule=(unsigned char *)malloc(sizeof(char)*(nb_rules));
    fread(lr->type_of_rule,sizeof(char),nb_rules,f);

#ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif
    lr->ftag_size=ubl.l;

lr->ftag=(unsigned char **)malloc(sizeof(char *)*(nb_rules));
    ligne=lr->ftag[0]=(unsigned char *)malloc(sizeof(char)*(lr->ftag_size));
    fread(lr->ftag[0],sizeof(char),lr->ftag_size,f);
```

(Tagger)

```
    for(i=0;i<=nb_rules-1;i++){
      lr->ftag[i]=ligne;
      while(*ligne!='\0')
        ligne++;
      ligne++;
    } ifndef INV
    ubl.str[0]=fgetc(f);
    ubl.str[1]=fgetc(f);
    ubl.str[2]=fgetc(f);
    ubl.str[3]=fgetc(f);
#else
    ubl.str[3]=fgetc(f);
    ubl.str[2]=fgetc(f);
    ubl.str[1]=fgetc(f);
    ubl.str[0]=fgetc(f);
endif
    lr->tag_to_put_size=ubl.l;

lr->tag_to_put=(unsigned char **)malloc(sizeof(char *)*(nb_rules));
    ligne=lr->tag_to_put[0]=(unsigned char *)malloc(sizeof(char)*(lr->tag_to_put_size));
    fread(lr->tag_to_put[0],sizeof(char),lr->tag_to_put_size,f);
    for(i=0;i<=nb_rules-1;i++){
      lr->tag_to_put[i]=ligne;
      while(*ligne!='\0')
        ligne++;
      ligne++;
    } lr->the_tab_char=(unsigned char *)malloc(sizeof(char)*256);
    fread(lr->the_tab_char,sizeof(char),256,f);

lr->goodleft_dico=read_autd13(f);
    lr->goodright_dico=read_autd13(f);
    lr->pref_dico=read_autd13(f);
    lr->suf_dico=read_autd13(f);

return lr;
} void write_tagger(FILE *f,TAGGER tagger){
  write_dico_lex(f,tagger->dic);
  write_lexrule(f,tagger->lr);
  write_sequbstard242(f,tagger->trans);
}

TAGGER read_tagger(FILE *f){
  TAGGER tagger;

tagger=(TAGGER)malloc(TAILLE_TAGGER);

tagger->dic=read_dicolex(f);
```

(Tagger)

```
    tagger->lr=read_lexrule(f);
    tagger->trans=read_sequbstard242(f);

return tagger;
}
void write_lexrule(FILE *f,LEXRULE lr){
    UBLOC ubl;

ubl.l=lr->nb_rules;
#ifndef INV
    fec(ubl.str[0],f);
    fec(ubl.str[1],f);
    fec(ubl.str[2],f);
    fec(ubl.str[3],f);
#else
    fec(ubl.str[3],f);
    fec(ubl.str[2],f);
    fec(ubl.str[1],f);
    fec(ubl.str[0],f);
endif ubl.l=lr->arg1_size;
ifndef INV
    fec(ubl.str[0],f);
    fec(ubl.str[1],f);
    fec(ubl.str[2],f);
    fec(ubl.str[3],f);
#else
    fec(ubl.str[3],f);
    fec(ubl.str[2],f);
    fec(ubl.str[1],f);
    fec(ubl.str[0],f);
endif fwrite(lr->arg1[0],sizeof(char),lr->arg1_size,f);

fwrite(lr->type_of_rule,sizeof(char),lr->nb_rules,f);

ubl.l=lr->ftag_size;
#ifndef INV
    fec(ubl.str[0],f);
    fec(ubl.str[1],f);
    fec(ubl.str[2],f);
    fec(ubl.str[3],f);
#else
    fec(ubl.str[3],f);
    fec(ubl.str[2],f);
    fec(ubl.str[1],f);
    fec(ubl.str[0],f);
endif fwrite(lr->ftag[0],sizeof(char),lr->ftag_size,f);
```

(Tagger)

```
    ubl.l=lr->tag_to_put_size;
#ifndef INV
    fec(ubl.str[0],f);
    fec(ubl.str[1],f);
    fec(ubl.str[2],f);
    fec(ubl.str[3],f);
#else
    fec(ubl.str[3],f);
    fec(ubl.str[2],f);
    fec(ubl.str[1],f);
    fec(ubl.str[0],f);
endif fwrite(lr->tag_to_put[0],sizeof(char),lr->tag_to_put_size,f);

fwrite(lr->the_tab_char,sizeof(char),256,f);

write_autd13(f,lr->goodleft_dico);
    write_autd13(f,lr->goodright_dico);
    write_autd13(f,lr->pref_dico);
    write_autd13(f,lr->suf_dico);
} void aff_lexrule(FILE *f,LEXRULE lr){
    unsigned long i;

fprintf(f,"LEXRULE\n");
    fprintf(f,"Nb of rules:%ld\n",lr->nb_rules);

for(i=0;i<=(lr->nb_rules-1);i++){
        if (lr->type_of_rule[i]==HASPREF){
            fprintf(f,"%s haspref %ld %s x\n",
                lr->arg1[i],
                strlen((char *)lr->arg1[i]),
                lr->tag_to_put[i]);
        }
        else if (lr->type_of_rule[i]==FHASPREF){
            fprintf(f,"%s %s fhaspref %ld %s x\n",
                lr->ftag[i],
                lr->arg1[i],
                strlen((char *)lr->arg1[i]),
                lr->tag_to_put[i]);
        }
    }
} int has_pref_in(unsigned char *word,AUT_D13 dico){
    unsigned char *ligne;
    unsigned long dep;
    int trv,fin;
    UBLOC *bloc;
```

(Tagger)

```
   dep=0;
   trv=0;
   ligne=word;
   bloc=dico->bloc;
   fin=NON;
   while(fin!=OUI && !trv){
     if (g_13(bloc[dep+SORTE_POS_D13])==COD_SORTE_D13)
        trv=1;
     else if (*ligne=='\0')
        fin=OUI;
     else{
        if (g_13(bloc[dep+(*ligne)])!=*ligne)
          fin=OUI;
        else
            dep=d_13(bloc[dep+(*ligne)]);

*ligne++;
     }

} return trv;
} int has_suf_in(unsigned char *word,AUT_D13 dico){
   unsigned char *ligne;
   unsigned long dep;
   int trv,fin;
   UBLOC *bloc;

dep=0;
   trv=0;
   ligne=&(word[strlen((char *)word)-1]);;
   bloc=dico->bloc;
   fin=NON;
   while(fin!=OUI && !trv){
     if (g_13(bloc[dep+SORTE_POS_D13])==COD_SORTE_D13)
        trv=1;
     else if (*ligne=='\0')
        fin=OUI;
     else{
        if (g_13(bloc[dep+(*ligne)])!=*ligne)
          fin=OUI;
        else
            dep=d_13(bloc[dep+(*ligne)]);

ligne--;
     }
   } return trv;
}
```

(Tagger)

```
int is_pref_of(unsigned char *word,AUT_D13 dico){
   int trv,fin;
   unsigned long dep;
   unsigned char *ligne;
   UBLOC *bloc;

dep=0;
   trv=0;
   ligne=word;
   bloc=dico->bloc;
   fin=NON;
   while(fin!=OUI && !trv){
      if (*ligne=='\0'){
         trv=1;
         fin=OUI;
      }
      else{
         if (g_13(bloc[dep+(*ligne)])!=*ligne)
            fin=OUI;
         else
             dep=d_13(bloc[dep+(*ligne)]);

*ligne++;
      }
   } return trv;
} int has_char(unsigned char *word,unsigned char *tab){
   unsigned char *ligne;
   int trv;

trv=0;
   for(ligne=word;*ligne!='\0';ligne++){
      if (tab[*ligne])
         trv=1;
   } return trv;
} void main(int nb,char **arg){
   int i,tp=0;
   TAGGER tagger;
   FILE *f;
   unsigned char c,*defaultTag;

init_tabcod();

defaultTag=(unsigned char *)malloc(sizeof(char)*100);
```

*17:31 Jun 16 1994*

(Tagger)

```
strcpy((char *)defaultTag,"NN");
for(i=1;i<=nb-1;i++){
   if (strcmp(arg[i],"-h")==0)
      f_help();
   else if (!strcmp(arg[i],"-lex1"))
      tp=1;
   else if (!strcmp(arg[i],"-lex2"))
      tp=2;
   else if (!strcmp(arg[i],"-default_tag"))
      strcpy((char *)defaultTag,arg[i+1]);                                1440
} f=p_open((unsigned char *)arg[1],"rb");
c=fgetc(f);
if (c==T_TAGGER)
   tagger=read_tagger(f);
else{
   fprintf(stderr,"The first argument of the program should be a tagger of type TAGGER.\n");
   fprintf(stderr,"It seems not to be of the correct type.\n");             1450
   exit(0);
} if (tp==0){
   tag_file(stdout,stdin,tagger,COMPLETE_TAGGING,defaultTag);
}
else if (tp==1){
   tag_file(stdout,stdin,tagger,DICTIONARY_TAGGING,defaultTag);
}
else if (tp==2){
   tag_file(stdout,stdin,tagger,DICO_LEX_TAGGING,defaultTag);               1460
}
}
```

Having above indicated several embodiments of the Subject Invention, it will occur to those skilled in the art that modifications and alternatives can be practiced within the spirit of the invention, It is accordingly intended to define the scope of the invention only as indicated in the following claims.

We claim:

1. A computer system for correcting part of speech tags of words of sentences in a text, comprising:

means for receiving an initially tagged input sentence; and, a contextual part of speech tagger for correcting part-of-speech tags of the words of said initially tagged input sentence, said tagger including a deterministic finite state transducer for tagging said words in accordance with context and in a single pass.

2. The system of claim 1 wherein said deterministic finite state transducer includes for each input word means for making only one tagging choice.

3. The system of claim 2 wherein said means for making only one tagging choice includes means for postponing any choice until sufficient context is detected to ascertain that one tagging choice among the possible tagging choices is correct.

4. The system of claim 1 wherein said input sentence has words, each word having an identifiable sequential position, and wherein said deterministic finite state transducer includes means for selecting a word at one position for analysis to determine the part of speech thereof, means for choosing the part of speech of said selected word based on the parts of speech of prior words in said sentence and means for inhibiting the choice of the part of speech for said selected word if the parts of speech of said prior words do not lead to a singular conclusion as to the part of speech of said selected word.

5. The system of claim 4 wherein said deterministic finite state transducer includes means coupled to said inhibiting means for analyzing the parts of speech of additional words in said sentence until the choice of the part of speech of said selected word is unambiguously clear.

6. The system of claim 5 wherein means for analyzing the parts of speech of said additional words only selects additional words which are subsequent in position to that of said selected word.

7. The system of claim 1 and further including means for initially tagging said sentence by first assigning the most likely part of speech to a word in said sentence without regard to surrounding words, and, means utilizing said deterministic finite state transducer for obtaining a final part-of-speech tag for said word using surrounding words for context.

8. The system of claim 1 wherein said deterministic finite state transducer is derived from a set of tagging rules generated from a training corpus of tagged text and wherein said deterministic finite state transducers includes non-deterministic transducers having said tagging rules as an input thereto, a composer for combining the outputs of said non-deterministic transducers into an omnibus non-deterministic transducer, and a determiniser for postponing decisions as to tagging choice until enough context information is available to make the correct tagging choice.

9. The system of claim 1 wherein said deterministic finite state transducer utilizes only a finite number of predetermined parts of speech sequences corresponding to differing contexts for the words in said sentence.

* * * * *